US008560436B2

(12) United States Patent
Ingram et al.

(10) Patent No.: US 8,560,436 B2
(45) Date of Patent: Oct. 15, 2013

(54) SYSTEM AND METHOD FOR ASSESSING CREDIT RISK IN AN ON-LINE LENDING ENVIRONMENT

(75) Inventors: Ronald N. Ingram, Spartanburg, SC (US); Dylan Littlewood, Victoria (CA); Aston Lau, Sunnyvale, CA (US)

(73) Assignee: Neobanx Technologies, Inc., Victoria (CA)

( * ) Notice: Subject to any disclaimer, the term of this patent is extended or adjusted under 35 U.S.C. 154(b) by 108 days.

(21) Appl. No.: 12/943,720

(22) Filed: Nov. 10, 2010

(65) Prior Publication Data

US 2011/0112957 A1    May 12, 2011

(30) Foreign Application Priority Data

Nov. 10, 2009  (CA) ...................................... 2685758

(51) Int. Cl.
*G06Q 40/00*         (2012.01)
(52) U.S. Cl.
USPC ............. 705/38; 705/7.42; 705/26.1; 705/35; 705/319
(58) Field of Classification Search
None
See application file for complete search history.

(56) References Cited

U.S. PATENT DOCUMENTS

| 7,031,939 | B1 | 4/2006 | Gallagher et al. | |
|---|---|---|---|---|
| 7,269,590 | B2 | 9/2007 | Hull et al. | |
| 7,472,089 | B2 | 12/2008 | Hu et al. | |
| 2005/0273406 | A1* | 12/2005 | Lebda et al. | 705/35 |
| 2006/0224502 | A1* | 10/2006 | McGowan | 705/38 |
| 2009/0132406 | A1 | 5/2009 | Brooks et al. | |
| 2010/0042511 | A1* | 2/2010 | Sundaresan et al. | 705/26 |
| 2010/0125475 | A1* | 5/2010 | Twyman | 705/7 |
| 2010/0332405 | A1* | 12/2010 | Williams | 705/319 |

FOREIGN PATENT DOCUMENTS

| WO | WO2007133315 | * 11/2007 |
|---|---|---|
| WO | WO2008126998 A1 | 10/2008 |
| WO | WO2008154648 A1 | 12/2008 |

OTHER PUBLICATIONS

United Nations Conference on Trade and Development, "E-Finance and Small and Medium-Size Enterprises (SMEs) in Developing and Transition Economies", UNCTAD Expert Meeting, Oct. 17, 2001.*

* cited by examiner

*Primary Examiner* — Robert Niquette
(74) *Attorney, Agent, or Firm* — Wyatt, Tarrant & Combs, LLP; Matthew A. Williams

(57) ABSTRACT

A method and system assigns trust ranks to nodes from disparate sources, such as user profiles found in social networking websites across the Internet. The score assigned to a profile is calculated from the subjective scores given to it by the connected profiles that have ranked it, and weighted according to the scores of those connected profiles. The score and associated data are stored in a central server with a searchable database that communicates with one or more third party application servers. The score and associated data are displayed on social networking websites according to user-defined criteria and available for use by third party users to assess the risk of doing business with a user.

16 Claims, 18 Drawing Sheets

SYSTEM AND METHOD FOR ASSESSING CREDIT RISK IN AN ON-LINE LENDING ENVIRONMENT

CROSS-REFERENCE TO RELATED APPLICATIONS

This patent application claims priority from Canadian Patent Application No. 2,685,758 filed Nov. 10, 2009, the entirety of which is hereby incorporated by reference.

TECHNICAL FIELD

The present disclosure relates to financial loans, and in particular to a system and method for assessing credit risk in an on-line lending environment using social networking capabilities.

BACKGROUND

The complexity of lending has increased with time and the process now involves numerous intermediaries and banks where now the ultimate funding source of a loan and its recipient rarely meet. Individuals deposit excess funds with regulated financial institutions; in turn, funds on deposit are made available to borrowers qualified by a chain of intermediaries who jointly authenticate the applicants' identity, access and assess the applicants' credit history, and return a report to the financial institution, who then extends an offer of credit. In many instances, small individual loans extended by financial institutions are assembled into large portfolios of debt which are then sold to external investors. Loans within these portfolios that are not repaid are then repackaged and resold to collection agencies. Loans that are designated uncollectible may be re-categorized and resold. Along each step of the life cycle of the loan from origination to collection, intermediaries are involved, each of which must be compensated, which adds to the costs involved in traditional lending and borrowing. This process impairs the quality of loan underwriting, risk assessment, and collections because the relationship between loan originator, capital provider, and borrower have been abstracted and obscured beyond recognition and the ultimate recipients and providers of loans have diminished social knowledge of each other, personal responsibility, and accountability.

In recent decades, lenders have sought increasingly objective criteria for evaluating borrower default risks. The standard categories that are assessed are:
  Character
  Credit
  Capacity
  Capital
  Collateral Character in this context refers to the willingness of an individual to meet their financial obligations. Traditionally recognized as the most important of these five elements, character is also the most subjective and time consuming to quantify or qualify. Bankers, when the size of transaction warrants, often rely on subjective intuition, first impressions and reputation to assess this intangible but key qualification criterion.

Today all but the largest loan decisions rely primarily on Credit and Capacity. Credit is based on often-flawed data reported to credit bureaus related to financial factors such as historical payment history and credit utilization. The source of this data is lenders who report data that is then archived in credit bureau databases. The data providers relay periodic, usually monthly reports, either manually or automatically. Capacity evaluation is based on borrower employment, income, credit utilization, debt service costs, overall debt, and expense ratios and other financial data which are all prone to inaccuracy due accidental or deliberate errors or omissions reported by customers, lenders and/or intermediaries.

Therefore there is a need for an improved system and method for assessing credit risk in an on-line lending environment.

SUMMARY

In accordance with the present disclosure there is provided a computer-implemented method of assessing credit risk of a borrowing party in an on-line lending environment. A request is received from a lending facilitation service to determine an assessment score for the borrowing party. A social networking service is identified that the borrowing party is associated with. The borrowing party is verified on the social networking service. A web page component is provided for installation on the borrowing party's user profile of the identified social networking service. Borrower data is received comprising borrowing party's user profile data and social networking connection data identifying additional user profiles linked to the borrowing party's user profile collected using the web page component. The social networking connection data of the received borrowing party's data is analyzed to determine a respective assessment score and length of time and level of activity of each first level connection of additional user profiles linked directly to the borrowing party's user profile on the social networking service to provide an assigned weighting for each first level connection to the respective assessment score. A base score is calculated for the borrowing party's profile based on the received borrower data. The borrowing party's user profile data and base score are stored in a user profile datastore. An assessment score is determined for the borrowing party using the base score and assessment scores and assigned weightings of the first level connections having assessment scores. The determined assessment score is stored in the user profile datastore.

In accordance with the present disclosure there is also provided a system for assessing credit risk in an on-line lending environment. The system comprises a communication network, a social networking service, coupled to the communication network, the social network service providing social structures between a plurality of user, and a lending facilitation service, coupled to the communication network, for facilitating a financial loan transaction between a lending party and a borrowing party accessing the lending facilitation service through the network, the lending facilitation service providing loan management facilities for enabling lending party and borrowing party to initiate, verify and manage financial loans. A borrower assessment system, coupled to the communication network, the borrower assessment system for determining characteristics of the borrowing party to generate characterization information including an assessment score based retrieved borrowings party's profile information and based upon information retrieved from a subset of interconnected user profiles linked directly to the borrowing party's user profile on the social networking service, the borrower assessment system providing the characterization information and the assessment score based upon the information retrieved from the social networking service to the lending facilitation service, wherein lending facilitation service provides the characterisation information and the assessment score to the lending party prior to lending to the borrowing party to better assess risk in providing a financial loan.

In accordance with another aspect of the present disclosure there is provided a computer readable memory containing instructions for performing a method of assessing credit risk of a borrowing party in an on-line lending environment when executed by a processor, the instructions comprising: receiving a request from a lending facilitation service to determine an assessment score for the borrowing party; identifying a social networking service that the borrowing party is associated with; verifying the borrowing party on the social networking service; providing a web page component for installation on the borrowing party's user profile of the identified social networking service; receiving borrower data comprising borrowing party's user profile data and social networking connection data identifying additional user profiles linked to the borrowing party's user profile collected using the web page component; analyzing the social networking connection data of the received borrowing party's data to determine age and activity of each first level connection of additional user profiles linked directly to the borrowing party's user profile on the social networking service; calculating a base assessment score for the borrowing party's profile; storing the borrowing party's user profile data and base assessment score in a user profile datastore; determining an assessment score for the borrowing party based on the base assessment score and the base score weightings of the first level connections; and storing the assessment score in the borrowing party's profile.

BRIEF DESCRIPTION OF THE DRAWINGS

Further features and advantages will become apparent from the following detailed description, taken in combination with the appended drawings, in which.

Figure 1:
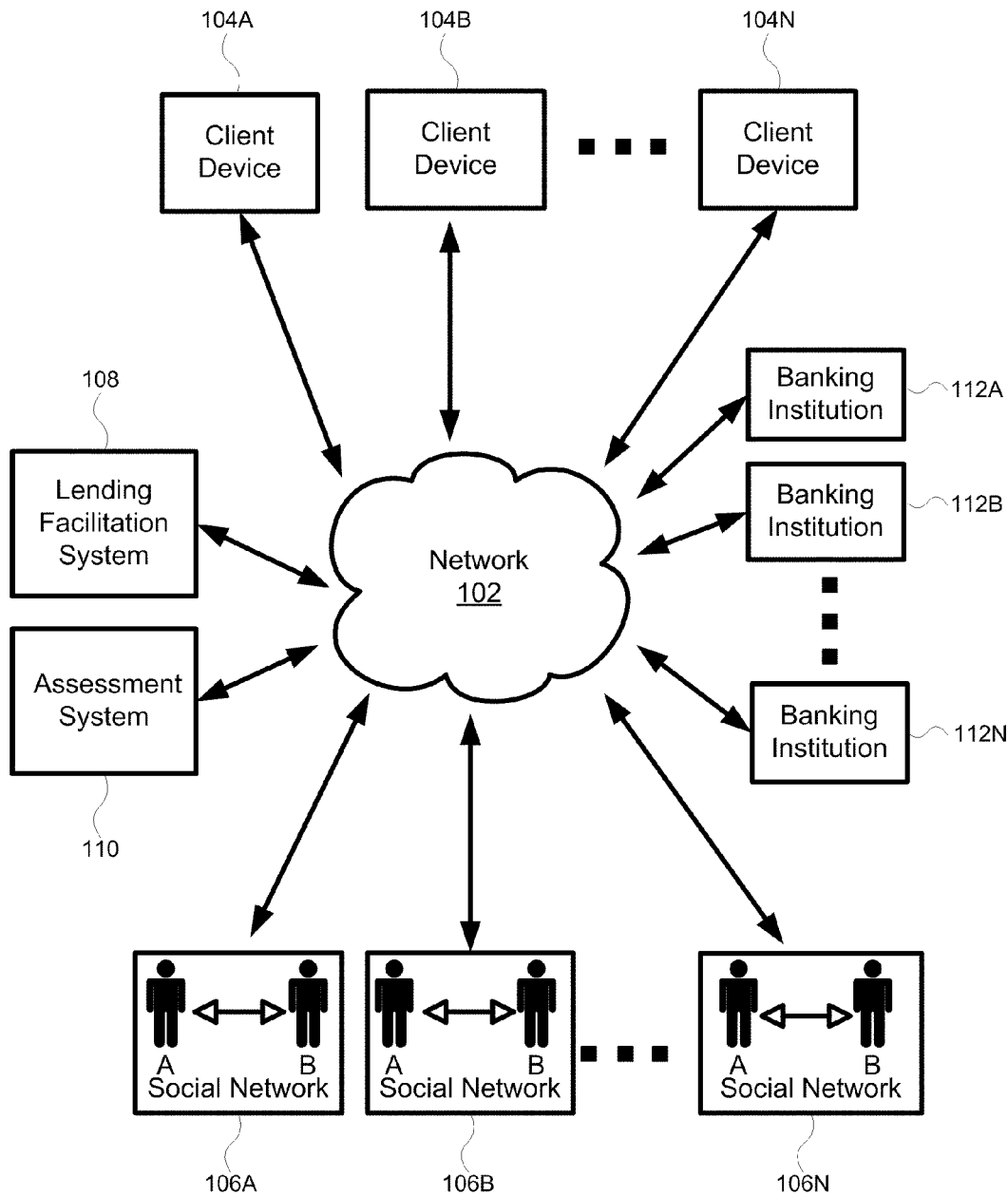
FIG. 1 is a high-level block diagram showing an illustrative system environment for calculating a score for an individual.

Although the figures and following descriptions contain many specifics for the purposes of illustration, anyone of ordinary skill in the art will appreciate that many variations and alterations to the following details are within the scope of the present disclosure. Accordingly, the following embodiments are set forth without any loss of generality to, and without imposing limitations upon, the claimed subject matter.

It will be noted that throughout the appended drawings, like features are identified by like reference numerals.

DETAILED DESCRIPTION

FIG. 1 is a high-level block diagram showing an illustrative system environment for calculating a score for an individual. The system environment comprises one or more client devices 104A-104N, one or more third-party social networking websites 106A-106N, a network 102, and a host site server 108 equipped with one or more databases for storing user information gathered from the client devices 104A-104N and third party social networks 106A-106N. In alternative configurations, different and/or additional modules can be included in the system environment.

The client devices 104A-104N comprise one or more computing devices that receive user input, as well as transmit and/or receive data through the network 102. For example, client devices 104A-104N can be desktop computers, laptop computers, smart phones, personal digital assistants (PDAs), mobile computing devices, or any other device that has computing functionality and data communication capabilities. The client devices facilitate interaction between users and the host site server 108 as well as the third party social networks 106A-106N via the network 102.

A third party social network 106 comprises a database of personal information on individuals and their connections to each other. For example, a third party social network can be a website such as Facebook™, a genealogy database, or any other data store that contains information on individuals and their relationships to one another.

The host site server 108 comprises a system that provides a front end user interface of a lending facilitation service such as an on-line lending service or a peer-to-peer (P2P) lending facilitation service. The lending facilitation service may communicate with a plurality of banking institutions 112A-112N in order to facilitate transactions such as transferring funds from an account of a user as well as deposit funds into an account of a user.

The lending facilitation service may communicate with an assessment system 110 in order to assess the trustworthiness and character of users of the lending service. The assessment system uses information retrieved from the social networks 106A-106D in order to generate an assessment score of a user that can be used in evaluating the suitability of the user for lending money to or borrowing money from. The assessment score may also be used to evaluate or determine loan terms of possible loans.

Figure 2:
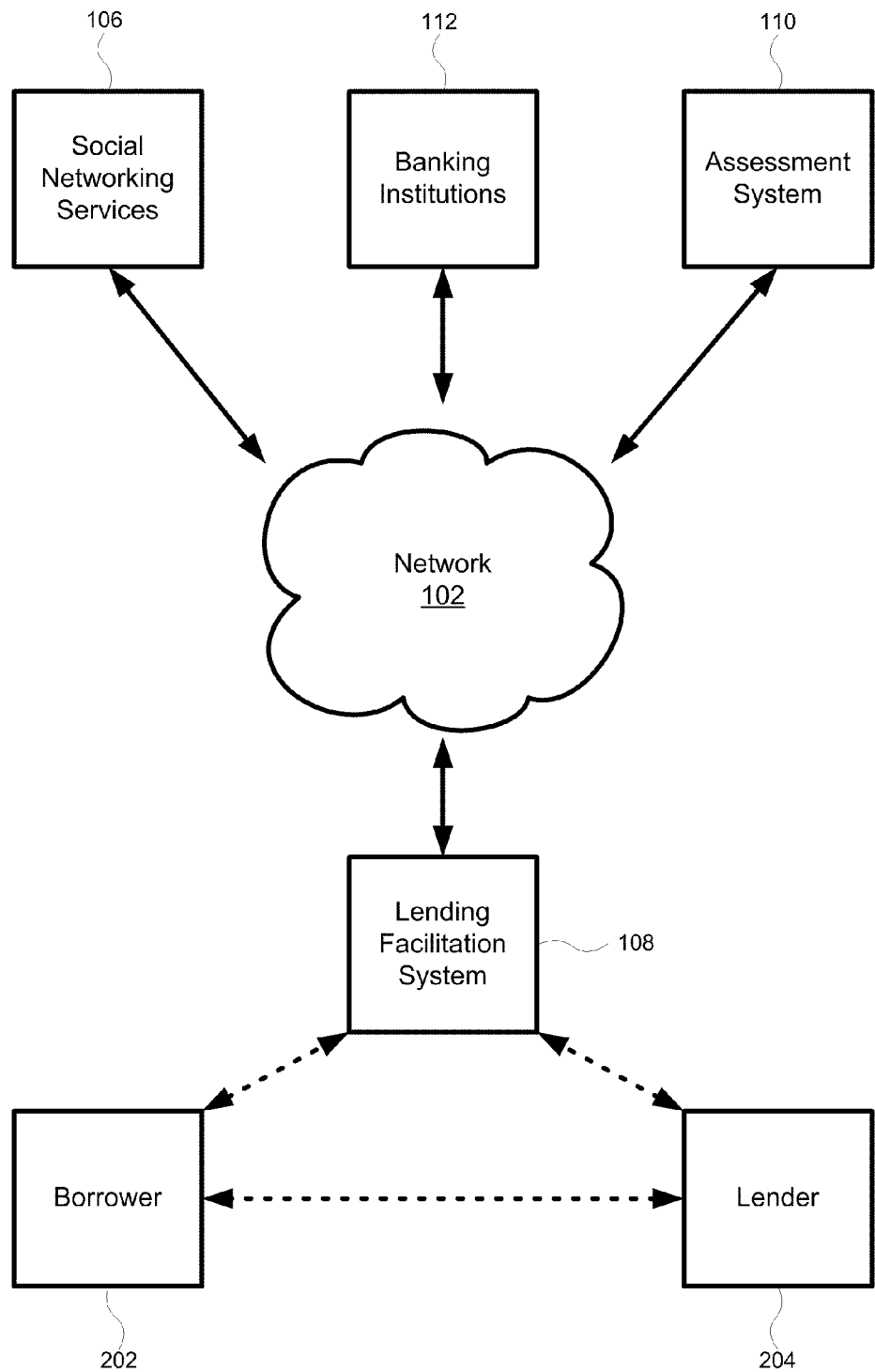
FIG. 2 is a block diagram the logical components of the system environment for calculating the score for an individual.

FIG. 2 depicts in a block diagram the logical components of the system environment for calculating the assessment score for an individual. The system environment comprises a lending facilitation system 108 that is connected to a network 102, such as the Internet. A social networking service 106, banking institutions 112 and an assessment system 110 are also coupled to the network 102. The lending facilitation system may be used by registered users to facilitate loans between an individual borrower 202 and an individual lender 204. When making the loan, the lender 204 may use the assessment score, which is calculated by the assessment system 110, in order to determine the suitability of the borrower 202, or to tailor the terms of the loan to the trustworthiness or character of the borrower 202.

The assessment system 110 may be used by the P2P lending facilitation system 108 in order to generate the assessment score for the borrower 202. The assessment system 110 receives information about the borrower 202 from one or more social networking services 106 that the borrower 202 uses. The assessment system 110 uses the received information to determine the assessment score of the borrower 202, which it may communicate to the lending facilitation system 108 for use in facilitating loans.

Figure 3:
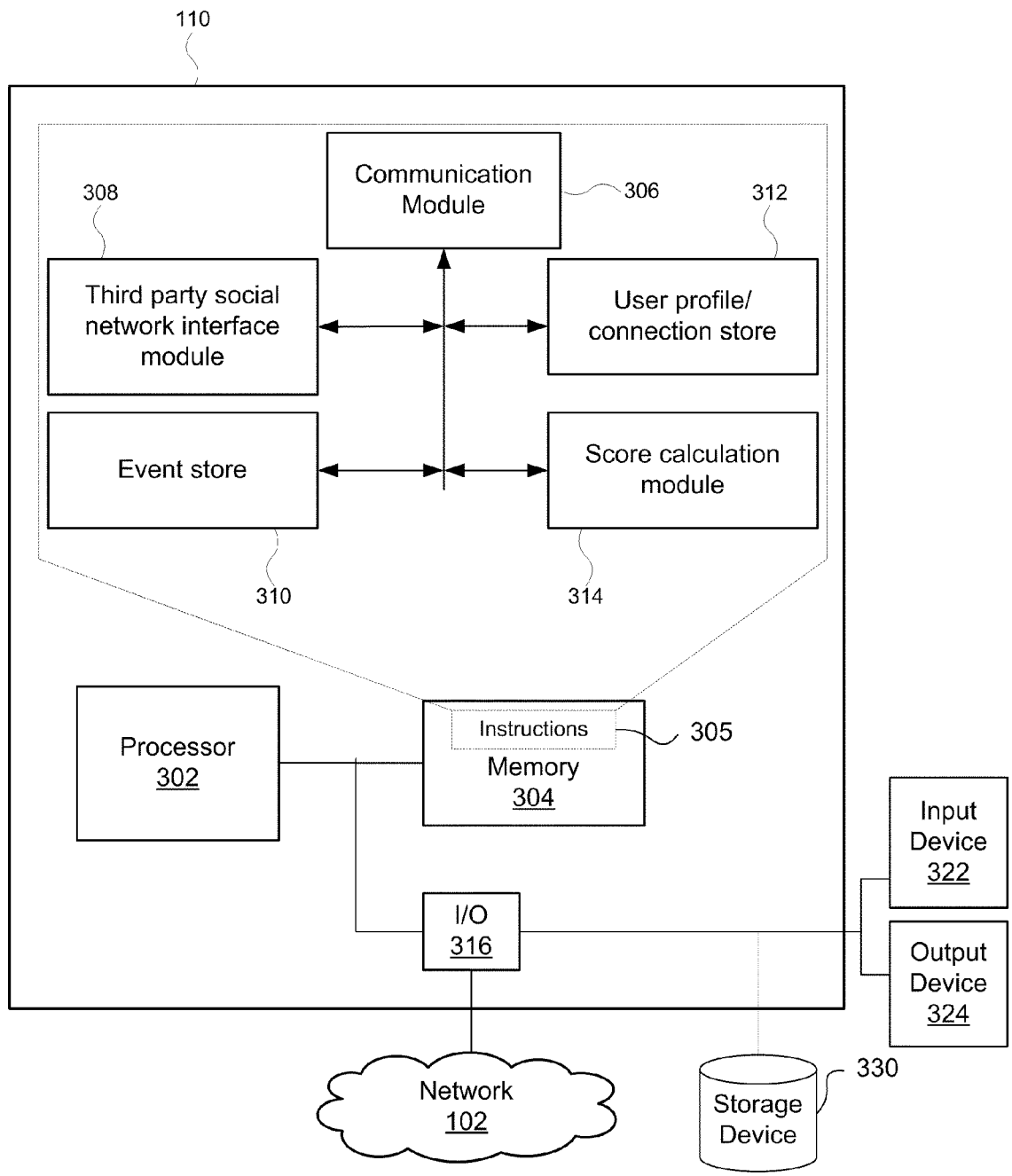
FIG. 3 is block diagram of an assessment system.

FIG. 3 illustrates an assessment system 110. The assessment system 110 may be implemented in a computer system comprising a processor 302 that is coupled to a memory 304 and an input/output (I/O) module 316. The I/O module 316 may couple the assessment system 110 to a network 102, as well as a storage device 330 for storing information. The I/O module 316 may further couple the assessment system 110 to an input device 322, such as keyboards or mice and an output device 324, such as a monitor or video display device.

The memory 304 stores instructions 305 for execution by the processor 302. When the instructions 305 are executed by the processor 302 they configure the assessment system to provide a communication module 306, a third party social network identifier module 308, an event store 310, a user profile and connection store 312, and a score calculation module 314. In other embodiments, the assessment system 110 may include different and/or additional modules.

In an alternative embodiment, the instructions 305 may be stored on a computer readable medium such as, but not limited to, an optical disc, a hard disk drive, a solid state memory device, or any other suitable random access memory or read only memory known to one skilled in the art.

The communication module 306 is the outward-facing module that provides an interface for the communicating with the assessment system. It receives requests to perform various actions, including requesting that an assessment score be determined for a user.

The third party social network interface module 308 comprises a module for identifying the social network to which a user belongs, and connecting with that social network via its established application programming interface (API) to gather information about the user and possibly install a web page component. For example, for the social networking website Facebook.com, the module can provide the backend of a Facebook™ application that would retrieve, store and analyze the user's personal details, as well as walk the user through the steps of installing the application to his/her Facebook profile.

The event store 310 provides a database to store a log of all activity that occurs within the assessment system 110.

The user profile/connection store 312 provides a database to store information gathered from a third party social network. When an assessment score is requested to be determined for a user, a permanent record for the user is generated and stored in this database. When the individual reveals a profile that he/she has on a third party social network, the assessment system 110 makes a note of the profile on the individual's permanent record and retrieves and stores the profile's connections to other individuals on that social network in the user profile connection store 312, and updates the user's assessment score accordingly.

The score calculation module 314 comprises a module that calculates a user's score based on the information gathered from the third party social network and contained in the user profile/connection store 312. Each time an assessment score is requested to be calculated for a new individual, the score calculation module 314 detects whether that individual has an existing connection to another person in the user profile/connection store, expands that database of known connections, and fine-tunes its ranking of both individuals based on their connections to each other.

Figure 4:
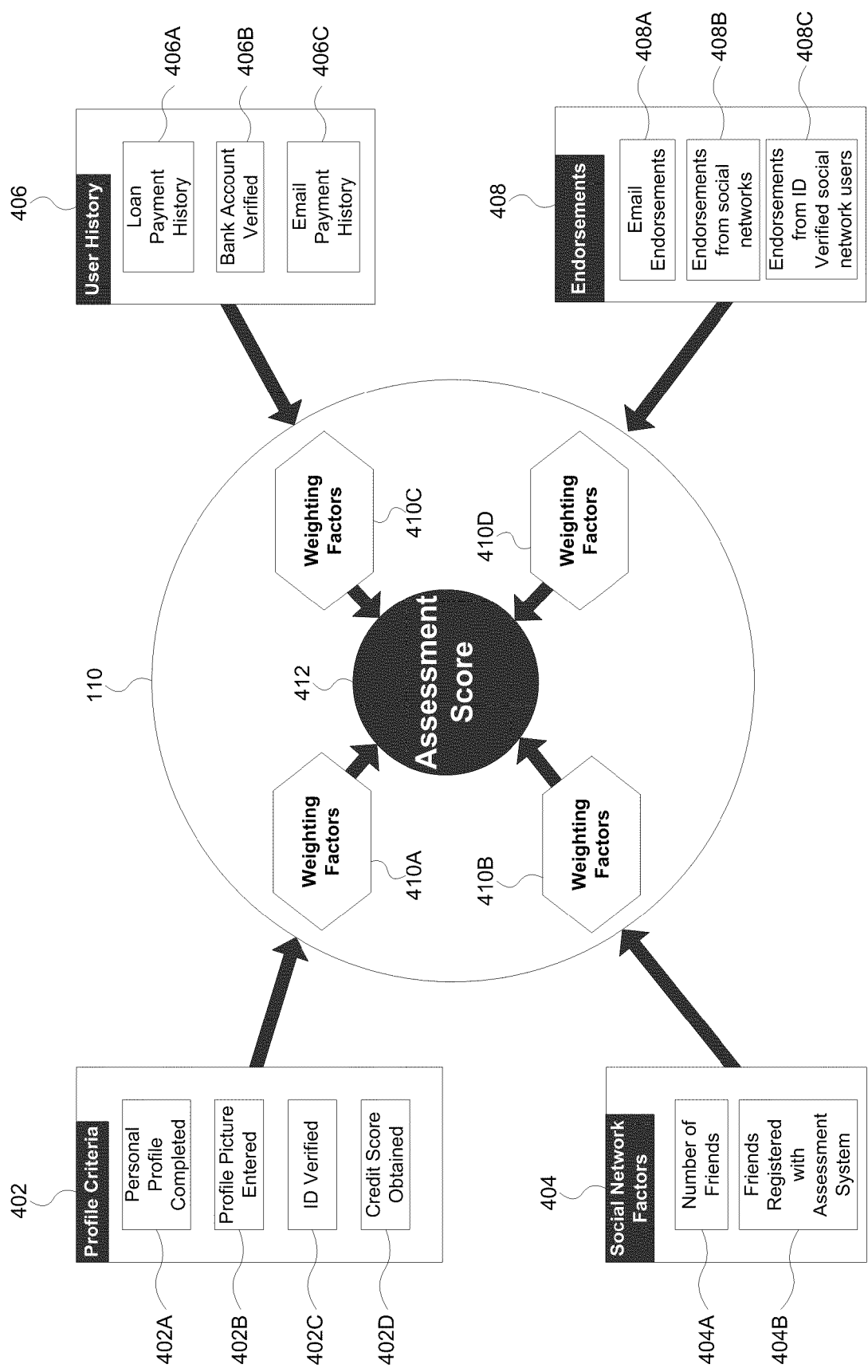
FIG. 4 is a representation of the information used by the assessment system.

FIG. 4 is a representation of the information that the assessment system 110 may use when determining an assessment score 412 for a user. Different types of information may contribute to the user's assessment score 412. Profile criteria 402 information may include completed personal profile information 402A, profile pictures that have been entered 402B, the verification of the user's ID 402C and obtained credit score information 402D. The profile criteria 402 may be modified by a weighting factor 410A to contribute to the assessment score 412.

Social network factors 404 may include the number of friends or other connections to user's in the social networking service 404A and information from friends registered with the assessment system 404B. The social network factors 404 may be modified by a weighting factor 410B to contribute to the assessment score 412.

User history 406 information may include loan payment history 406A, verified bank account information 406B, and email payment history 406C. The user history 406 information may be modified by a weighting factor 410C to contribute to the assessment score 412.

Endorsements 408 may include email endorsements 408A, endorsements from social networks 408B and endorsements from ID verified users of social networks and the assessment system 408C. The endorsements 408 may be modified by a weighting factor 410D to contribute to the assessment score 412.

Figure 5:
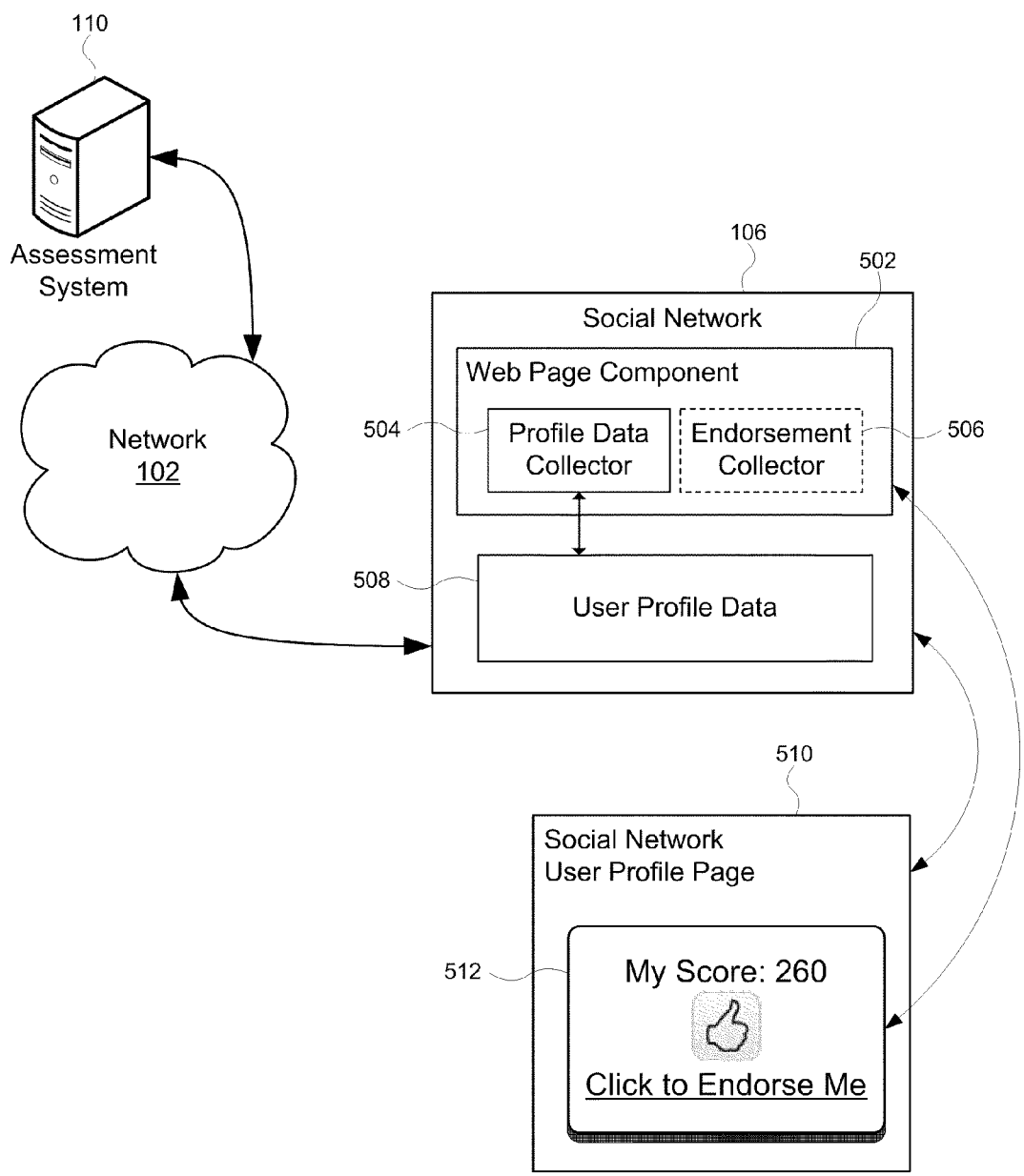
FIG. 5 a high-level diagram to illustrate a web page component that may be used to gather information on the user from their third party social network.

FIG. 5 provides a high-level diagram to illustrate a web page component that may be used to gather information on the user from their third party social network. A web page component 502, which may be hosted on the assessment system 110, is installed on the user's profile page of the third party social network 106. Once installed on the third party social network 106, the web page component 502 may retrieve personal information about the user, which it may then Send to the assessment system 110 for storing in the user connection/profile store 312. The web page component 502 may comprise a profile data collector module 504 that collects the user profile data 508 on the third party social network service 106. The data collector nodule 504 may communicate the collected profile data to the assessment system 110.

The web page component 502 may also comprise an endorsement collector module 506 that provides a mechanism for other user's of the third part social network to provide an endorsement of the user, which can affect the assessment score of the user. The web page component 502 may also display the user's assessment score, and possibly the endorsement mechanism 512 to all visitors to the user's profile page 510 on the third party social network 106. The assessment system may communicate with the web page component 502 to update what the web page component displays on the user's profile page 510, for example the user's current assessment score.

Figure 6:
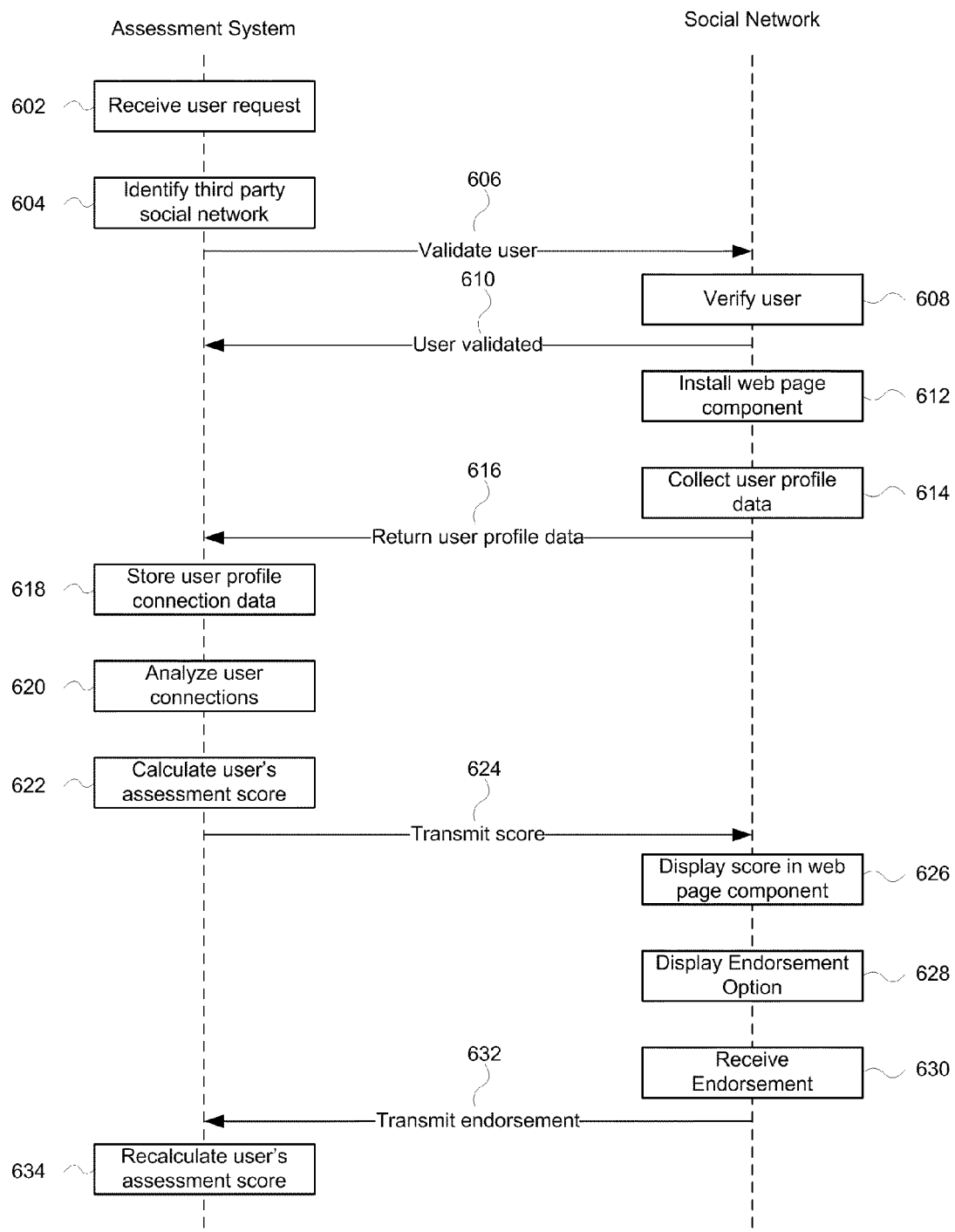
FIG. 6 shows a method of determining information about an individual's connections to friends and family in order to generate a user's assessment score.

FIG. 6 depicts a method of determining information about an individual's connections to friends and family in order to generate a user's assessment score. The assessment system 110 receives request to determine a user's assessment score (602). The request may be received from, for example, the lending facilitation service. The assessment system may then identify the third party social network (604) in question. The assessment system may then contact the social network (606) in order to validate the user's social network credentials. If the user is validated (608) the social network can indicate to the assessment system that the user was validated (610). The user may also be directed to install, or the assessment system may install, a web page component (612), which is a small portable chunk of code provided by the assessment system that can be embedded within the user's profile page on the third party social network. The installed web page component collects personal information on the user (614), such as the user's name, address, date of birth, and in particular his or her connections to other users within the social network. The gathered data is transmitted back to the assessment system (616), whereupon it is stored in the user connection/profile store (618). The user's profile and relationship data is analyzed (620) and an assessment score is calculated (622).

The assessment score can then be transmitted (624) to the third party social network, where the information may be displayed (626) via the web page component. If the web component includes an endorsement module an endorsement may be received (628), for example, a visitor to the user's profile page clicks on an 'Endorse Me' link. When an endorsement is received (630), it can be transmitted (632) to the assessment system and the user's assessment score recalculate (634).

Figure 7:
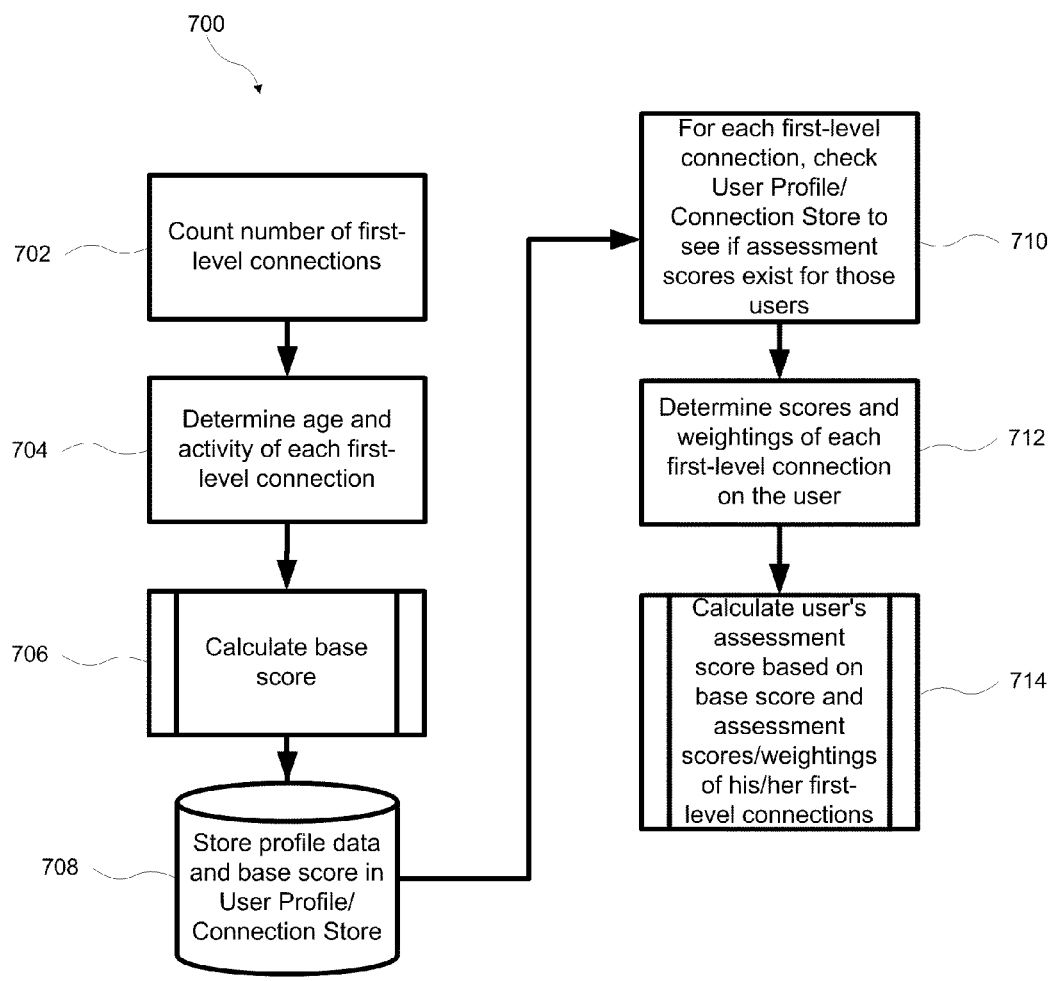
FIG. 7 shows a method of calculating the user's assessment score.

FIG. 7 depicts an illustrative method (700) of calculating the user's assessment score. The assessment score calculation method (700) may be performed by the score calculation module 314. Using the user profile data retrieved from the third party social network, the method (700) first counts the number of friends connected to the profile (702), i.e. first-level connections. It also attempts to determine the length of time and level of activity of each of those connections (704), assigning more weight to connections that have more recent activity and that have existed for a longer period of time. A base score for the user is then calculated (706) based on these connections and weightings, as well as additional factors including (but not limited to) points for profile registration, bank account verification, ID verification, number of co-signers, number of friends, number of verified friends, endorsements from friends, endorsements from verified friends, said friends' assessment scores, credit score and credit bureau data, and number of first-level connections of third party social networks. A user's base score can also change over time, based on additional factors including (but not limited to) successful payments to lenders or vendors, transaction history, payments missed, payments caught up, default on financial obligations, changes to credit score and credit bureau data, manual verification, positive or negative lender feedback about a borrower, borrower or customer feedback about lender, and changes to the number of first-level connections of third party social networks.

Once the base score is calculated, it and all profile data is stored (708) into the User Profile/Connection Store. Once this is complete, the calculation module then analyzes the User Profile/Connection Store (710) to see if any of the profile's connections have also undergone the process of obtaining an assessment score. If such data exists, the assessment scores of these connections are retrieved and weightings determined (712), with this data being factored into the calculation of the user's assessment score (714).

Figure 8:
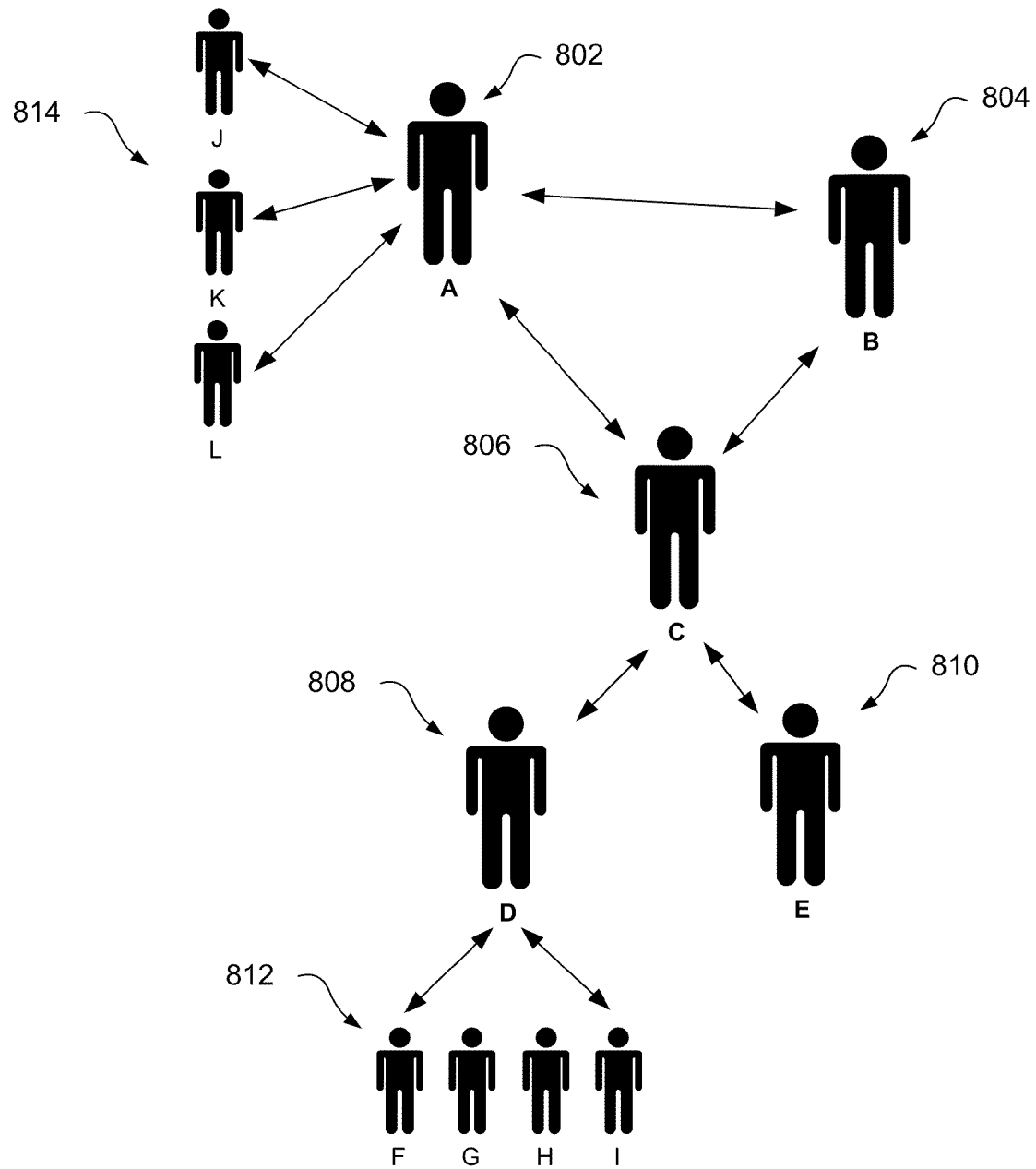
FIG. 8 illustrates a possible relationship between twelve profiles A through L.
Figure 9:
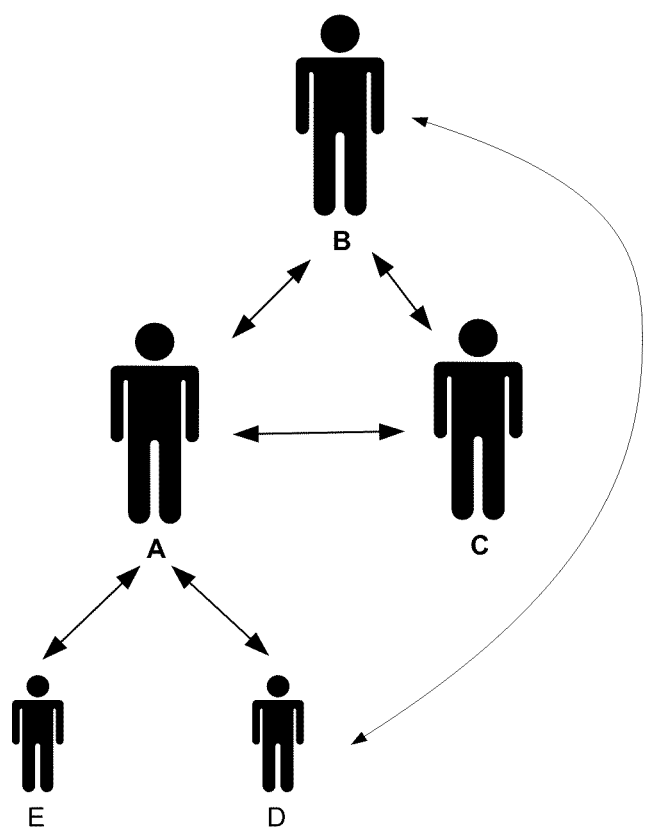
FIG. 9 illustrates an example of a social network where individuals A, B, C and D are connected to each other.
Figure 10:
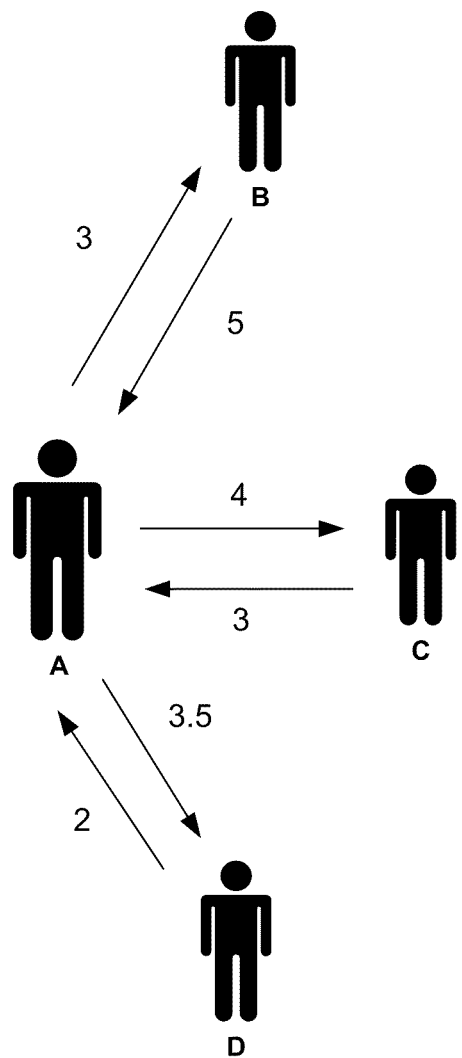
FIG. 10 illustrates an example of this endorsement mechanism.

One embodiment of the present method of calculating a score can be described in the example social network illustrated in FIGS. 8-10. A social network can be represented as a graph of N nodes, where each node correlates to a user profile belonging to a person, and where the connections between the nodes correlate to connections that the users have established between each other to denote a real-life relationship. It will be appreciated that the graph can either be directed or undirected, depending on whether or not the particular social network allows one-way relationships; the method of trust ranking described in the present disclosure will work with both. A given profile is connected to a plurality of other profiles, which in turn are connected to a plurality of yet more profiles.

FIG. 8 illustrates a possible relationship between twelve profiles A through L. In this particular figure, profile A 802 is directly connected to five other profiles, namely profiles B 804, J-L 814 and C 806, which is connected to three other profiles, including profile D 808. Profile D 808 is connected to four other profiles 812 and profile E 810. Hence the score for profile A 802 would be affected by the score for profile C 806, and to a lesser degree, to profiles D 808 and E 810, even though A is not directly connected to either D or E directly. In one embodiment of the present method, the score for profile A can be represented as:

$$s(A)=b(n)+\alpha(s(B_1)+\ldots+s(B_n))$$

where n is the number of friends in profile A's immediate circle, b(n) is a function calculating A's base score, $B_1, \ldots, B_n$ are friends of A, $s(B_1)+\ldots+s(B_n)$ are their scores, and $\alpha$ is a scaling constant in the interval (0, 1).

In addition to the method of scoring based on the scores of connected individuals, the present disclosure may take into account the weighting that each connected individual has to the individual being evaluated. Specifically, if two individuals share one or more common connections, it is an indicator that they are part of a more closely-knit network of friends, and thus it can be inferred that they have a stronger bond. It also follows that, the more common friends that two individuals share, the more weight they carry in affecting each other's score.

FIG. 9 illustrates an example of a social network where individuals A, B, C and D are connected to each other. When determining the score for individual A, the scores for B, C, D and E must be taken into account. The weighting that B has on A's score will be the greatest of the four connections, since A and B share two common friends C and D. The influence that C has on A's score will be less, since A and C only share one common friend B. Finally, the weighting that E has on A's score will be even lower, since E and A share no common connections.

In one embodiment of the present method, the weight assigned to a connection between individual A and individual B can be described as $$s(A)=b(n)+\alpha(s(B_1)\cdot w(A,B_1)+\ldots+s(B_n)\cdot w(A,B_n))$$

where n is the number of friends in profile A's immediate circle, b(n) is a function calculating A's base score, $B_1, \ldots, B_n$ are friends of A, $s(B_1)+\ldots+s(B_n)$ are their scores, $w(A, B_1)+\ldots+w(A,B_n)$ is a function representing weighting based on the number of shared connections of A and $B_n$, and $\alpha$ is a scaling constant in the interval (0, 1).

The present disclosure, the weight attributed to a connection between two individuals can also be affected by a manually assigned score, or in other words, an endorsement by one individual to another. By allowing a user to give an opinion of his/her peers' overall trustworthiness, a more accurate judgment can be rendered and reflected in an individual's assessment score. FIG. 10 illustrates an example of this endorsement mechanism: in this example, endorsements are given on a scale of 0 to 5, with 5 being the highest endorsement and 0 being the lowest. Because individual B has given a score of 5 out of 5 to individual A to indicate that he feels that A is extremely trustworthy, the weighting that B has on A's score will be higher than that of A's other connections.

In addition to the aforementioned, the present disclosure also allows individuals to build their score by soliciting endorsements from others in their social circle. This can be done either actively by sending email or other forms of electronic messages to a friend, or passively by posting the web page component 502 to places where others would be likely to see it, such as on a blog or personal page on a social network such as Facebook™ or LinkedIn™.

A user, referred to as an inviter, might build his/her score through the proliferation of the web page component and may also solicit endorsements through feedback. The inviter may select the website to which he or she would like to install the web page endorsement component for the purpose of soliciting endorsements. The user may actively solicit endorsements from selected friends within that social network using the web page component, by sending invitations via a form of electronic message to friends whom the user has selected to receive said invitations.

The invitee(s) receives the endorsement invitation, and if he or she elects to respond to the request, he or she may click a link embedded in the invitation and be directed to the assessment system or web page component where he or she is asked whether or not to endorse the inviter. If he or she elects to endorse the inviter, he or she is asked to rate the inviter's perceived trustworthiness, for example on a numerical scale. Because the invitee is a known entity with a unique identifier on a third party social network, the assessment system can track his or her endorsement to ensure that that particular user can only endorse the inviter once. The endorsement of the invitee may also be weighted according to the his or her perceived trustworthiness, based on as many of the aforementioned base scoring factors as are available, including number of first-level connections, how long the profile has existed, and an assessment score if the invitee has signed up for one.

To further enable an individual to enhance their assessment score, the present disclosure also includes a mechanism of validating the identity of the individual over the Internet by asking personal questions to which only the individual would have the answer. An individual can further enhance their assessment score by uploading photos, videos, and personal information to show to potential transaction partners to enrich their knowledge of each other.

When used in a lending facilitation system the assessment system described herein helps users to gain insight into the character and trustworthiness of an entity when face-to-face contact and character evaluation would not be feasible. In today's highly mobile society, it is advantageous to have a system that represents the strength of an individual's reputation as measured by their peers. Even without personal knowledge, the present disclosure allows users to measure otherwise intangible and obscure qualities such as reputation and character. This information may be particularly useful to online lenders. The assessment score can be used to assess risk as well as determine appropriate terms for a loan negotiated online between borrowers and lenders with fewer intermediaries and therefore lower cost.

The assessment system facilitates direct lending between borrowers and lenders. The current state of the art favors one or the other, which creates credit supply and demand imbalances. Current implementations of lending systems and processes have not achieved their potential because they appeal primarily to borrowers and make lenders compete, which tends to attract a surplus of borrowers and suppresses lender interest. The present disclosure caters equally to borrowers and lenders, providing greater flexibility for lenders to make loans on their terms while also benefiting borrowers by helping to ensure that there will be a larger supply of credit available for them to borrow.

Using the assessment system, a lender can assess a borrower's trustworthiness, which facilitates direct loans between the lender and borrower, instead of requiring lenders to have multiple small loans in order to mitigate the risk of default associated with the loan. The present disclosure simplifies and facilitates collections for lenders since the loans may be direct one-to-one loans. The present disclosure may create a separate loan agreement for each loan transaction whereas the prior state-of-the-art utilizes a syndication or "many-to-one" model to mitigate the risk of default, which confuses and complicates collections if a loan goes into default. The present disclosure simplifies collections because if a loan goes into default, the lender is provided full recourse to collect directly from the borrower or engage a third party of their own choosing to do so for them.

As described above, the assessment system may be used advantageously in a lending system. The lending system may provide one-to-one loans between a borrower and a lender. A lending facilitation service using an assessment system is described further below.

Figure 11:
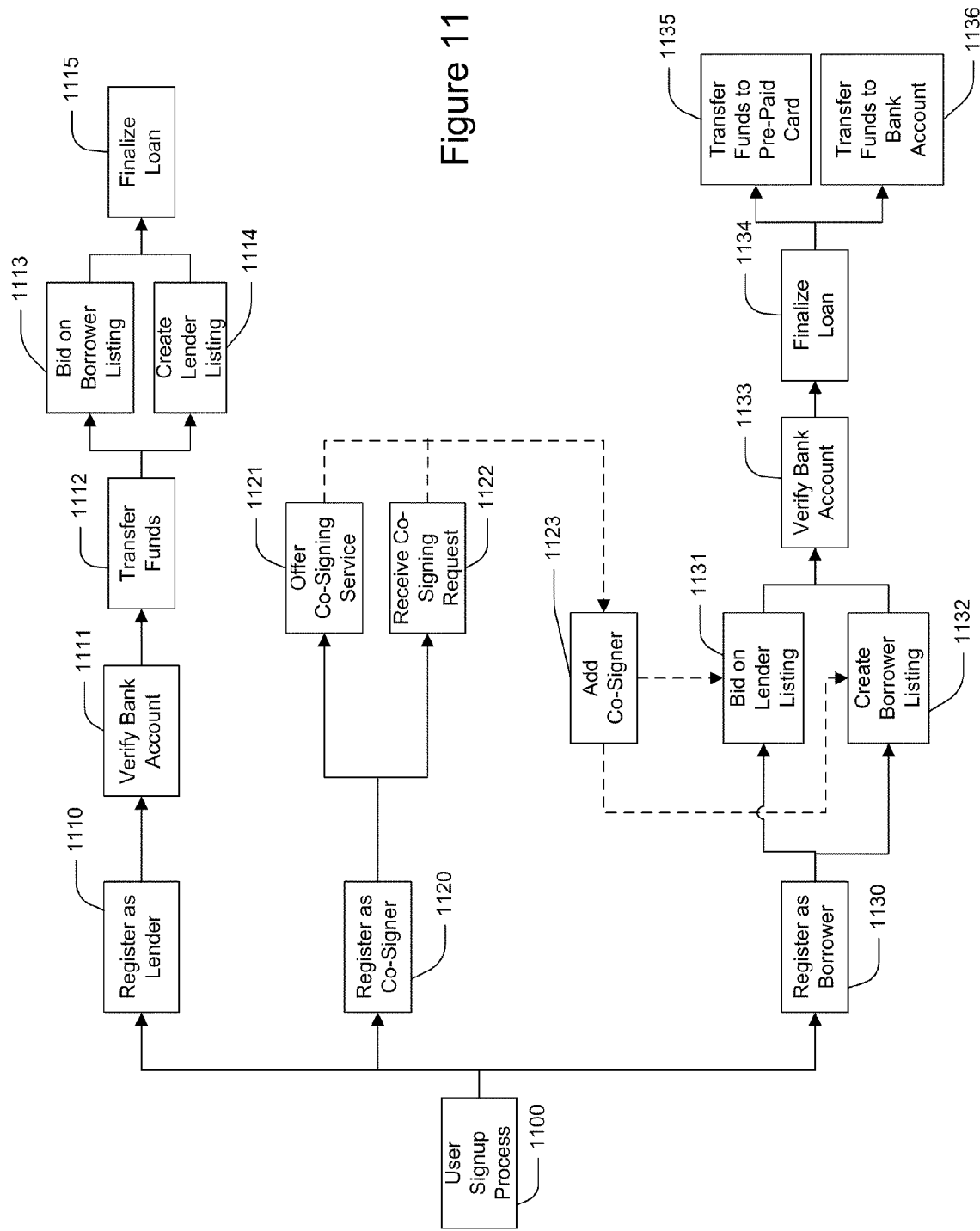
FIG. 11 illustrates the principal processes offered by the system to allow users to register as a user, create and bid on listings, become a co-signer and finalize loans.

FIG. 11 illustrates the principal processes offered by the system to allow users to register as a user, create and bid on listings, become a co-signer and finalize loans. A user signup process (1100) signs user's up for the lending service. The user signup process allows the user to create a login with the lending facilitation website based on choosing a unique identifier (username), email address and password. These data items are then stored in the database. The system sends an email to the user's specified email address containing a unique URL. The user cannot proceed further in the process until the URL is clicked to confirm that the email address given belongs to the user, at which point a record of the email address is stored in the database.

Once the user is signed up, the user may register as one or more types of users. The user may register as a lender (1110), a co-signor (1120), or a borrower (1130). If registered as a borrower, a user may bid on a lender listing (1131), which may require adding a co-signor (1123), or create a borrower listing (1132), which may include a co-signor (1123). After a loan has been accepted, either through a bid on a lender listing or through acceptance of the borrower listing, the user's bank account is verified (1133), the loan finalized (1134) and the funds transferred to a pre-paid card (1135) or to a bank account (1136).

When the user registers as a co-signor (1120), they may offer co-signing service (1121) or receive a request for co-signing (1122). A registered co-signor may be added as a co-signor (1123) on a loan.

When a user registers as a lender (1110), their bank account is verified (1111), the funds that the lender wishes to loan through the lending facilitation service are transferred (1112) and the lender can either bid on a borrower listing (1113) or create a lender listing (1114). After a loan to a borrower has been selected it is finalized (1115).

Figure 12:
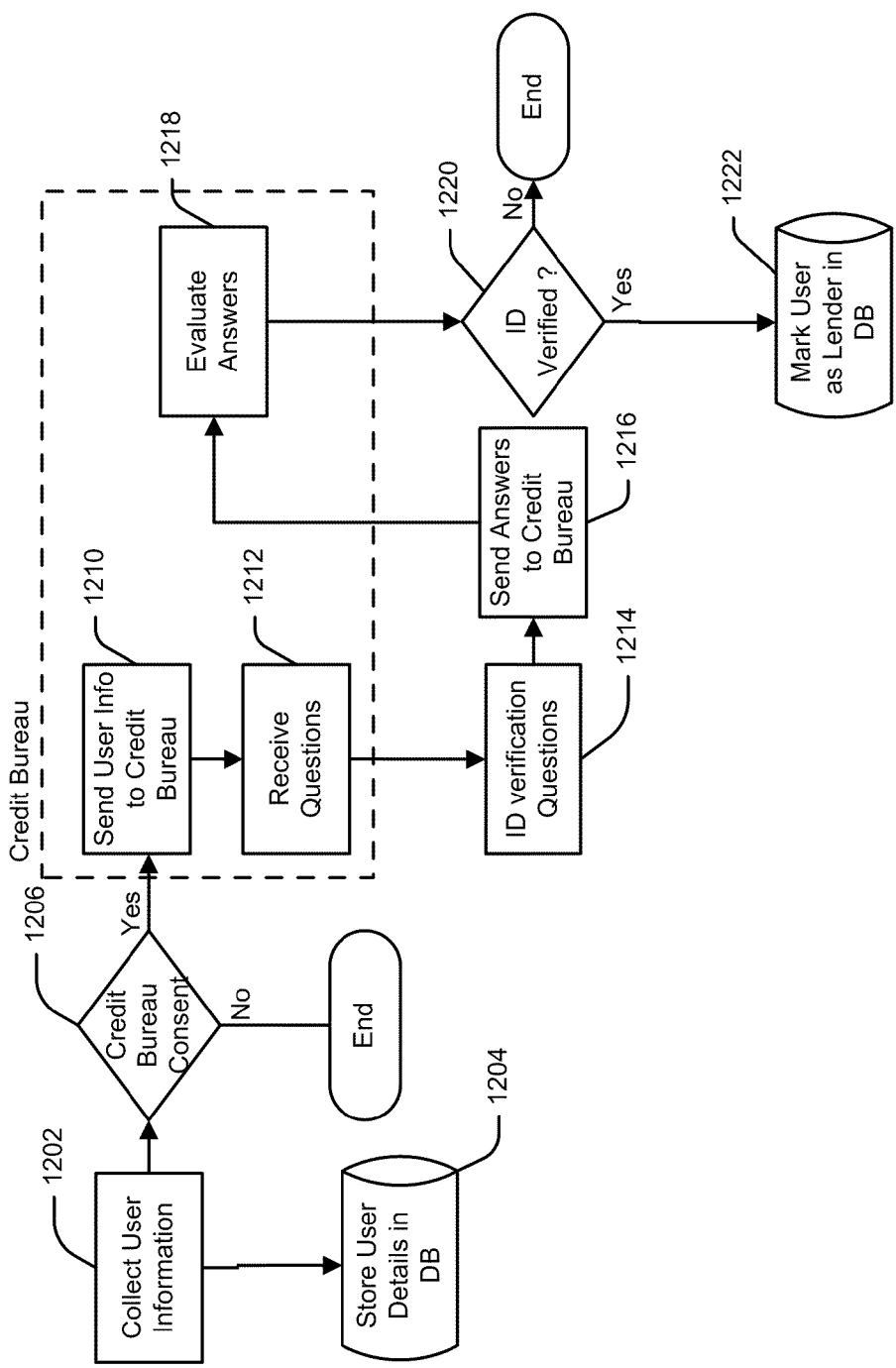
FIG. 12 illustrates the process that allows a signed up user to become registered as a lender, who is able to lend money to other users.

FIG. 12 illustrates the process that allows a signed up user to become registered as a lender, who is able to lend money to other users. The user first elects to begin the lender registration process by clicking a button or link instructing the system to display the initial screen in the process. The system presents a screen allowing the user to enter sufficient information about themselves (1202) for a credit bureau to identify them and enable the user's files to be accessed. This information includes full name, date of birth, social insurance or social security number (optional), address, and telephone number. The provided information is then stored in the database (1204). The system presents the user with a request to approve interaction with the credit bureau (1206). In the event the user declines to consent to the credit bureau interaction (No at 1204), the process terminates, although the user is free to restart this process in the future. If the user grants his or her consent to share his or her information to the credit bureau (Yes at 1204), the server interacts with the credit bureau's servers, transmitting the captured user information (1210) and requesting questions for the ID validation process. The credit bureau's system may be unable to identify the user if data is entered incorrectly or their credit file is thin or doesn't exist; if this occurs, the process may restart collecting user information. If the credit bureau is able to identify the user and identification questions are received (1212), the user is presented those questions (1214) and the answers provided are sent to the credit bureau's servers for evaluation (1216). Upon evaluation (1218), the credit bureau's servers respond with a communication containing the result of whether or not the user can be considered identified. The result received from the credit bureau is evaluated by the host site server (1220). If the result from the credit bureau is not confirmation of identity (No at 1220), the process ends with an appropriate message to the user presented on the screen, although the user is allowed to restart the registration process at any time. If the credit bureau reports the user as being ID validated (Yes at 1220), the user is recorded in the DB as being a registered lender (1222).

Figure 13:
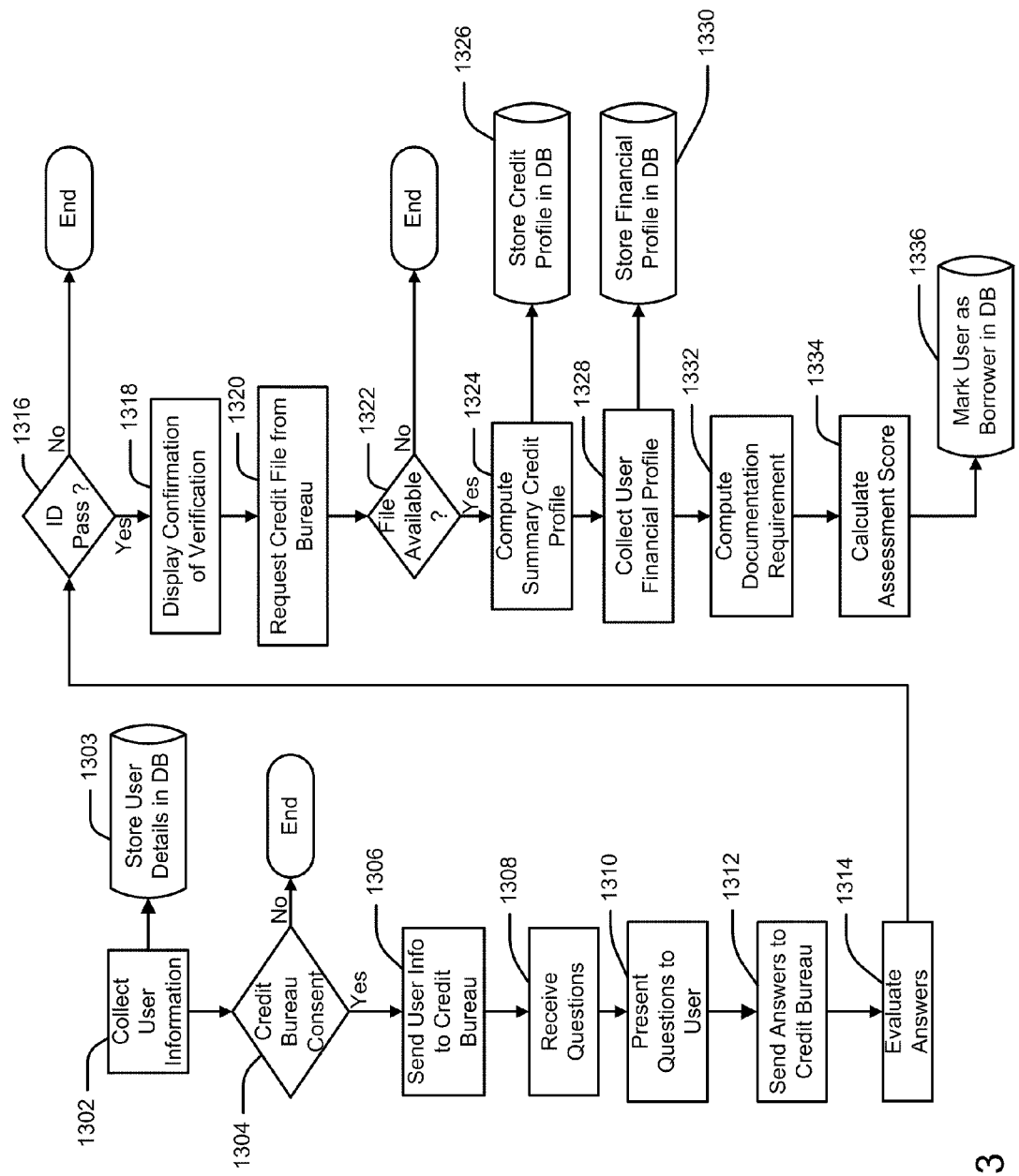
FIG. 13 illustrates a process that an initially signed up user undergoes to become registered as a Borrower.

FIG. 13 illustrates a process that an initially signed up user undergoes to become registered as a Borrower, who is able to seek and obtain loans from other system users. The user first elects to begin the borrower registration process by clicking a button or link instructing the host computer to display the initial screen in the process. A screen is presented allowing the user to enter sufficient information about themselves (1302) for the credit bureau to identify them and enable the user's file to be accessed. This information may include full name, date of birth, social insurance or social security number (optional), address and telephone number. The provided information is then stored in the database (1303). The system presents the user with a request to approve interaction with the credit bureau (1304). In the event the user declines to consent to the credit bureau interaction (No at 1304), the process terminates, although the user is free to restart this process in the future. If the user grants his or her consent to share his or her information to the credit bureau (Yes at 1304), the server interacts with the credit bureau's servers, transmitting the captured user information (1306) and requesting and receiving questions for the ID validation process. The credit bureau's system may be unable to identify the user if data is entered incorrectly or their credit file is thin or doesn't exist; if this occurs, the process restarts. If the credit bureau is able to identify the user and identification questions are received (1308), the user is presented those questions (1310) and the answers provided are sent to the credit bureau's servers for evaluation (1312). Upon evaluation (1314), the credit bureau's servers respond with a communication containing the result of whether or not the user can be considered identified. The result received from the credit bureau is evaluated by the host site server (1316). If the result from the credit bureau is not confirmation of identity (No at 1318), the process ends with an appropriate message to the user presented on the screen, although the user is allowed to restart the registration process at any time. If the credit bureau reports the user as being ID validated (Yes at 1316), the user is recorded in the DB as being a registered lender, and confirmation of the verification may be presented to the user (1318).

Upon user validation, a request is sent to the credit bureau for the user's credit file (1320). The credit bureau's system determines whether or not the user's credit file is available (1322). If the credit file is unavailable (No at 1322), the system displays an appropriate message explaining why the file is unavailable and the process ends, although the user may attempt this process again at any time. If the credit file is available (Yes at 1322), the system parses the user's credit file to compute a grading based on their credit score (1324), which places the user in one of a number of risk classifications (AA, BB, CC, DD, EE, FF, HR), in addition the system generates a summary of the key points of the user's credit history which can be displayed to prospective Lenders within the system. The system displays a screen to inform the user of the Grading and the information that will comprise their credit summary. This grade classification and credit history summary are then stored in the database (1326).

Once the user proceeds to the next screen by clicking the 'Next' button, the system displays a screen to allow the user to enter information to form a summary of their financial situation, including employment and other income and principal expenses (including housing, fuel, loans, food and other categories), all on a monthly basis (1328). Once the user submits the financial information it is stored in the database (1330). The system then processes the financial information entered by the user in conjunction with their credit grading and credit summary information to determine whether the user is required to submit any supporting documentation (1332), and what types of documentation, prior to being able to obtain a loan. These requirements for supporting documentation are displayed to the user on a screen. The process may then calculate, and store, an assessment score using the assessment system (1334). The method ends with marking the user as a borrower (1336).

Figure 14:
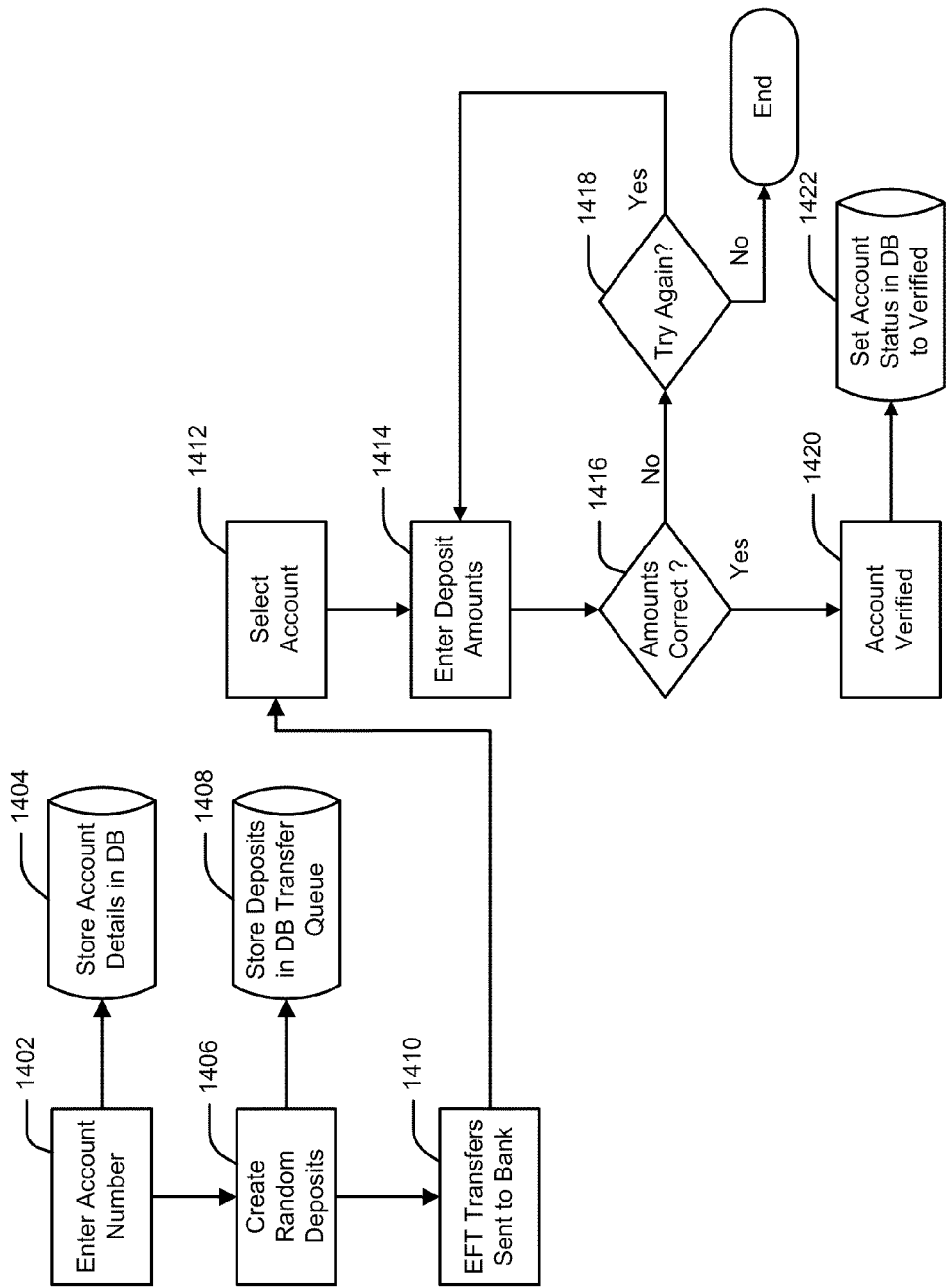
FIG. 14 illustrates the process that a user undergoes to add and verify a bank account to their profile.

FIG. 14 illustrates the process that a user undergoes to add and verify a bank account to their profile on the system. Adding a bank account to a user profile allows the system to store the user's account details and retrieve them for use at any future time to allow the user to perform transactions to send money to or from their bank account.

The user first elects to begin the process of adding a bank account by clicking a link labeled "Add Bank Account". The system then displays a screen to allow the user to enter the unique information that identifies their account, for example a bank identifier, transit code and account number (1402). Once the user submits this account information the system stores it in the database (1404). The system then generates two random numbers in the range 1 to 100 which are then used generate two deposits (in the range 1 cent to 1 dollar) (1406). These two deposit amounts are stored in the database (1408) as deposit transactions which are stored in the queue of pending transactions to be processed and submitted to the bank for processing.

At a later time (for batch based EFT processing this may be the next day) the deposit transactions are submitted to the bank along with all other pending transactions (1410).

The process displays a user's home page including a confirmation message of the process of adding their bank account being completed, pending verification of the account by confirming the amounts deposited To verify the added bank account and complete the addition process, the user elects to begin the verification process by clicking a link labeled "Verify Bank Account". The system then displays a screen to allow the user to select the bank account they wish to verify from a list of all those they have registered with the system (1412). Once the user has selected an account, they enter the two random deposit amounts for verification (1414). When the user submits the amounts the system compares them with the amounts contained in the transaction history in the database (1416). If they are incorrect (No at 1416), the system displays an appropriate message offering the user a chance to try again to enter these amounts (1418). If the user does not wish to try again (No at 1418) the process ends. If the user does wish to try again (Yes at 1418), the user may enter the deposit amounts again (1414).

If the amounts entered are correct (Yes at 1416), the system displays a message confirming this and informing the user that the account is now available for use (1420). The system records the verified status of the account in the database (1422). The process ends with the user's home page being displayed, this user being free to invoke further actions from here.

Figure 15:
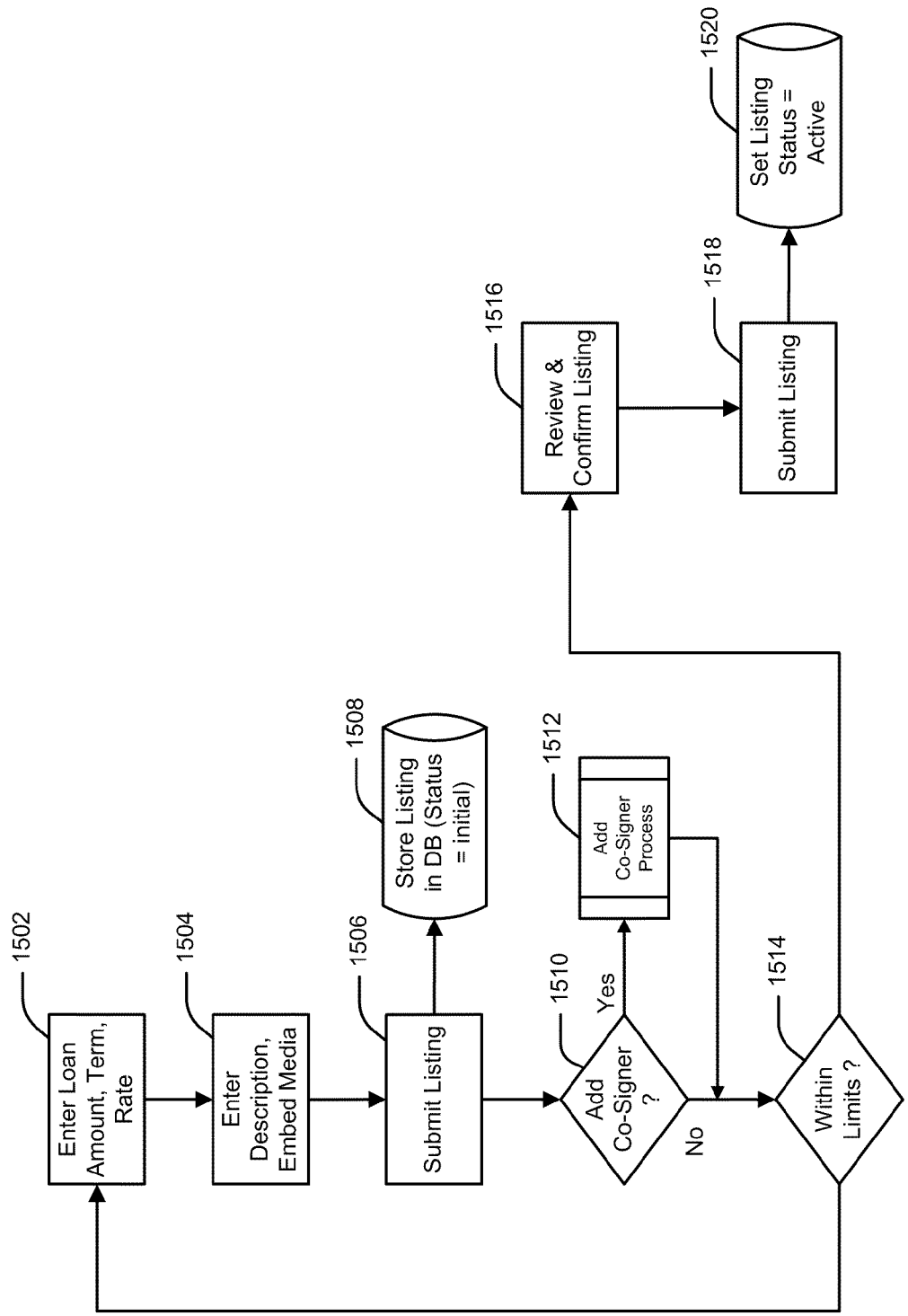
FIG. 15 illustrates the process that the user performs to create a listing within the system soliciting a loan from another user.

FIG. 15 illustrates the process that the user performs to create a listing within the system soliciting a loan from another user. The user elects to begin the process of creating a listing within the system to advertise their desire for a loan, and for Lenders to make Bids on those listings, by selecting (clicking on) a button or link. The system displays a screen allowing the user to enter details of the loan they are seeking, including Loan Amount, Term, Interest Rate, whether they are willing to insure or offer a Co-Signer in association with their loan (1502). A further element of the user interface presented to the user is the ability to enter a detailed description of who they are, why they are seeking the loan, etc. This can also include the ability to embed enhanced text such as HTML code or multimedia elements such as direct links to videos on Youtube™ (1504). The user description may include the user's assessment score.

Once the user has entered the listing components, the user submits the listing to the system (1506). The system stores the details of the user's listing in the database along with a status flag that indicates the listing is in an initial state and not yet finalized (1508). The system displays a page allowing the user to link a co-signer to their requested loan as a co-guarantor (1510). If the user elects to add a co-signer (Yes at 1510), the process to add a Co-Signer is invoked (1512).

Once the user either adds or declines (No at 1510) to link a co-signer to their listing, the system computes whether the parameters of the sought loan are within the system wide or individual limits for the user (1514). If the loan is not within permitted limits (No at 1514), the process returns to step (1502) to allow the user to modify their listing or start again. This validation includes any amount the user currently has outstanding on any existing loans in computing the limits on loan amount.

The system then presents the user with a screen previewing their listing and asking them to confirm it before it becomes active in the system (1516). Once the user indicates that they wish to submit their listing (1518), the system updates the listing stored in the database with any amendments the user made and marks the listing as active (1520). The process then terminates with the system displaying user's home page along with a message that the listing was successfully posted, the user being free to invoke further actions from the home page.

Figure 16:
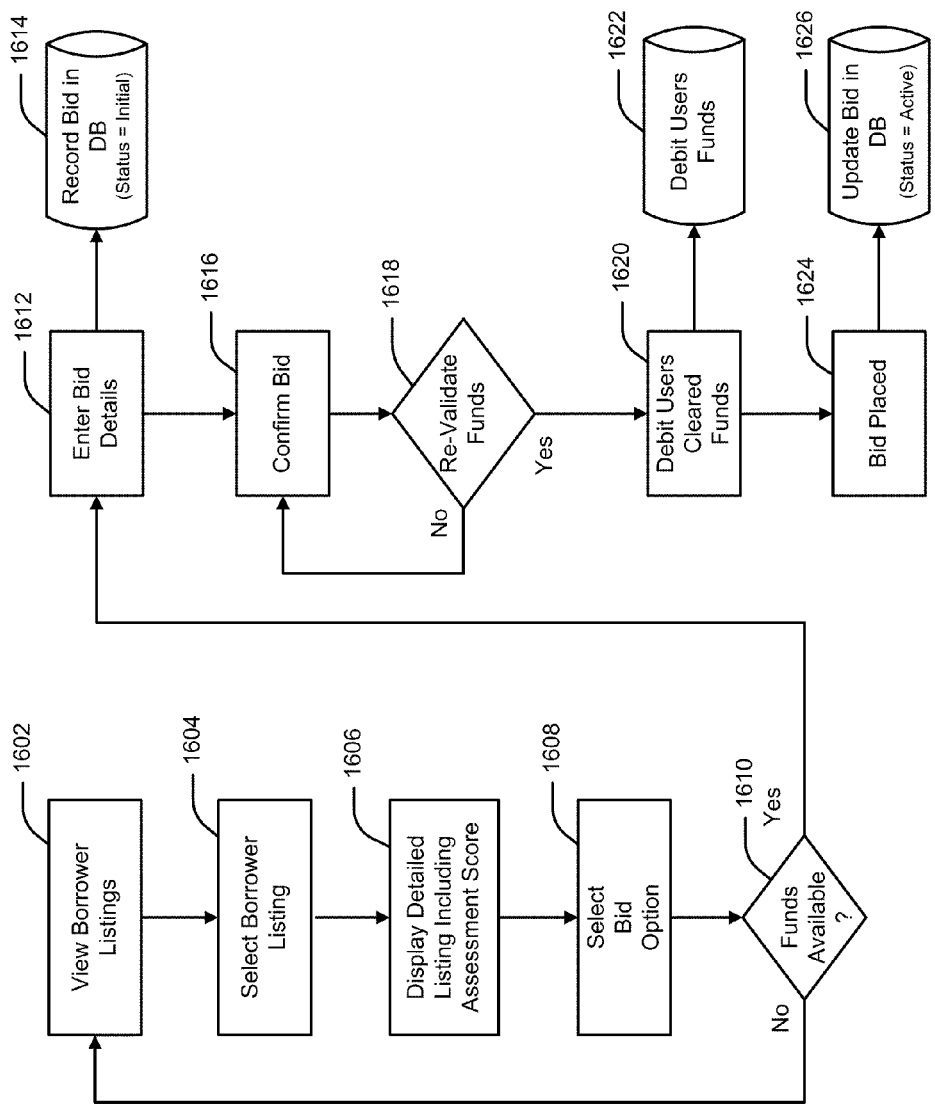
FIG. 16 illustrates the process that a user registered as a Lender performs to place a bid on a listing created by Borrowers.

FIG. 16 illustrates a process that a user who is registered with the system as a Lender performs to place a bid on a listing within the system created by a Borrower soliciting a loan from another user. Lenders commit their funds to a bid on a listing, and if at the close of an auction they are the winning bidder, the funds assigned to the bid will automatically become a loan for the Borrower.

The user elects to begin the process of entering a bid within the system by clicking a button link to view listings created by users who are Borrower's. The system displays a page containing a listing (partial if necessary) of Borrower Listings, including summary details of the loan terms sought, and possibly the borrower's assessment score (1602). The user is able to select an individual listing for further examination or review by clicking on any part of the text of the listing summary (1604). When the user selects an individual listing, the system displays a page presenting full details of that listing (1606), including the assessment score of the user that created the listing.

If the user viewing the listing is registered in the system as a Lender, the detailed listing page includes a button allowing the user to place a Bid on that listing. The user can invoke this feature by clicking on, for example a Bid button (1608). When a user registered as a Lender selects the Bid option, the system evaluates whether that user has sufficient funds available to place a Bid equal to the loan's amount (1610). If the user does not have sufficient funds to fund the loan (No at 1610), the system returns the display to the detailed listing page (1602).

If the lender has sufficient funds to fund the loan (Yes at 1610), the system displays a screen allowing the user to enter the parameters of the Loan they are wishing to offer as their Bid (1612). The lender can adjust the terms of the offered loan based on the user's assessment score, and other personal information provided. The system records the details of the user's Bid in the database with a status of Initial (1614). The system presents the user with a screen summarizing the user's Bid and asking them to confirm before it is placed (1616). Once the user confirms their Bid the system revalidates the availability of sufficient funds in their clearing balance before finalizing the Bid (1618). If the funds are no longer available (No at 1618), processing returns to the bid confirmation (1616).

If the funds are still available (Yes at 1618), the user's cleared funds are debited for an amount equal to the loan amount plus any applicable fees, such as a Loan Arrangement fees (1620). These funds are assigned to a committed funds record attached to the user's Bid. The system records the debit to the user's cleared funds and creation of the committed funds record in the database (1622).

The system upgrades the user's Bid from Initial to Active (1624), this is then recorded in the database by the system (1626). The process ends with the system displaying confirmation to the user that the Bid was successfully placed, and reporting the funds assigned to the Bid and moved to the user's committed balance.

Figure 17:
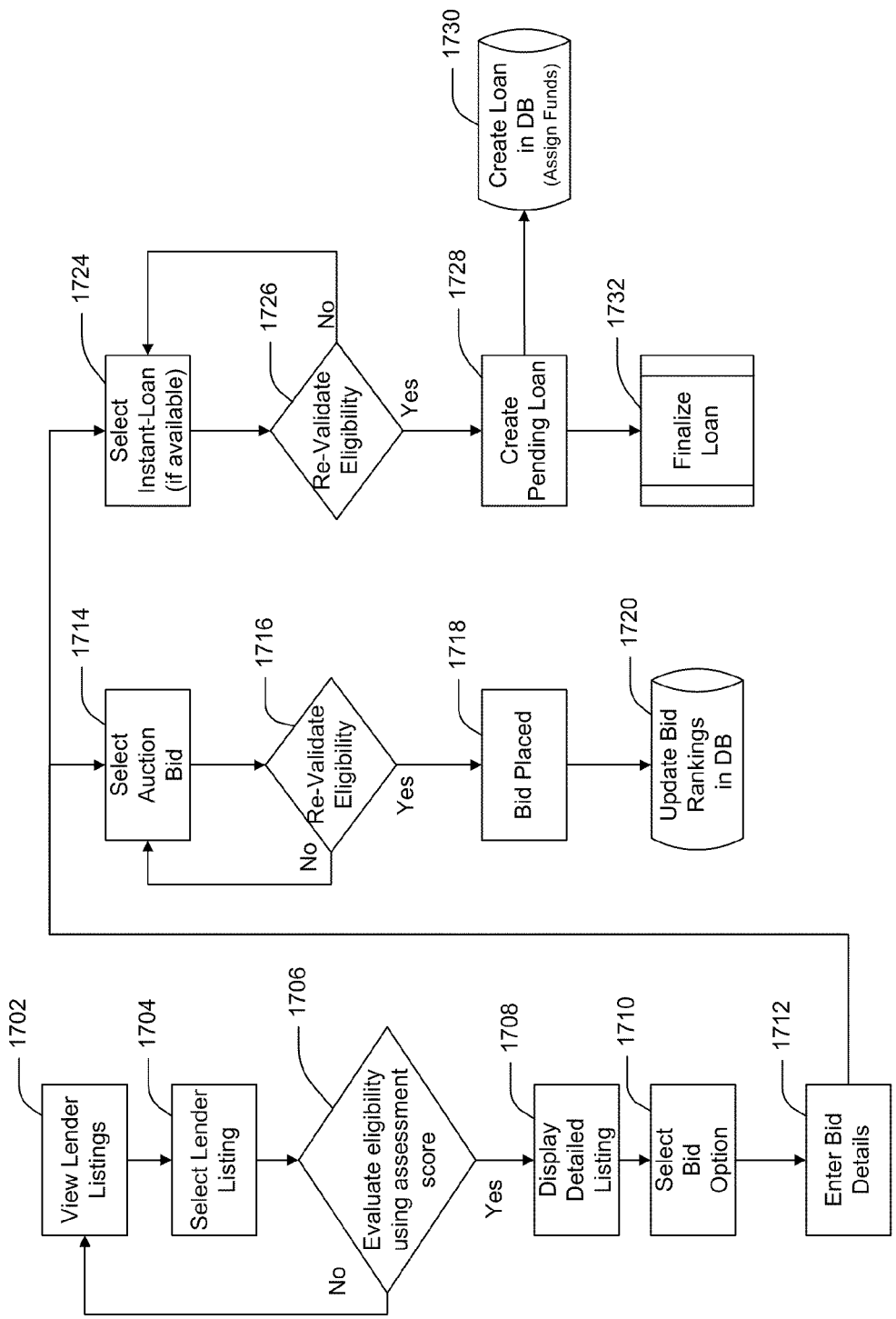
FIG. 17 illustrates the process that allows a user registered as a Borrower to place bids on listings created by Lenders.

FIG. 17 illustrates the process that the system uses to allow users who are registered in the system as Borrowers to place bids on listings created by Lenders offering their funds as Loans to users who meet the eligibility criteria they define. The user elects to begin the process of creating a listing to offer their funds as loans to prospective Borrowers by clicking on a button or link. The system displays a page containing a listing (partial if necessary) of Lender Listings, including summary details of the loan terms offered (1702). The list may only contain the lender listings for which the borrower is qualified, for example the user's assessment score meets or exceeds a minimum assessment score associated with the listing set by the lender. The user is able to select an individual listing for further examination or review by clicking on any part of the text of the listing summary (1704). Prior to displaying the detailed listing, the system evaluates the Borrower's information stored in the DB, including the user's assessment score against the Lender's eligibility criteria defined for the listing (1706). Only Borrowers who meet the Lender's criteria will be able to place a Bid on a listing.

When the user selects an individual listing, the system displays a page presenting full details of that listing (1708). If the user meets the eligibility criteria defined by the Lender, the standard Bid option is available by default. The Instant-Loan option is enabled if it was elected by the Lender. The user is presented with a choice of one or both of these options as appropriate. The system displays a screen for the user to enter the details of the Bid they wish to place (1710). This can include loan amount, length of loan as well as the interest rate and instant-loan if available, depending on the parameters defined by the user who created the listing. If the user selects the instant loan option the bid details may be automatically entered for the user.

If the auction bid option is selected, for example by the user clicking the 'Bid' button (1714), the system re-computes the Borrower's eligibility (1716) to reconfirm that they are eligible to place a bid. If the user is not eligible (No at 1716), the process may return to select the bid option (1714), or alternatively end or select another option. If user is still eligible (Yes at 1716), the user's Bid is placed (1718) and if there are other Bids the ranking of Bids is recomputed. If there are more bids than loans available, one or more bids will become outbid. The system records the user's bid and updates the Bid rankings in the database (1720). The process ends with the system displaying confirmation to the user that their Bid has been placed.

If the instant loan option is selected, for example by the user clicking the 'Instant-Loan' button (1724), the system re-computes the Borrower's eligibility (1726) to reconfirm that they are eligible to place a bid. If the user is not eligible for the loan (No at 1726), processing returns to selecting the instant loan option (1724), or alternatively the processing may return to selecting the bid option, or the process may end. The system then creates a loan that is marked as 'Pending' and the Lender's funds that are assigned to the listing are debited to the amount of the loan being granted plus the arrangement fee applicable to the loan (1728). The system creates the loan record and adjusts the funding record associated with the listing in the database (1730). The system then invokes the Loan Finalization process for the user to conclude their loan (1732).

Figure 18:
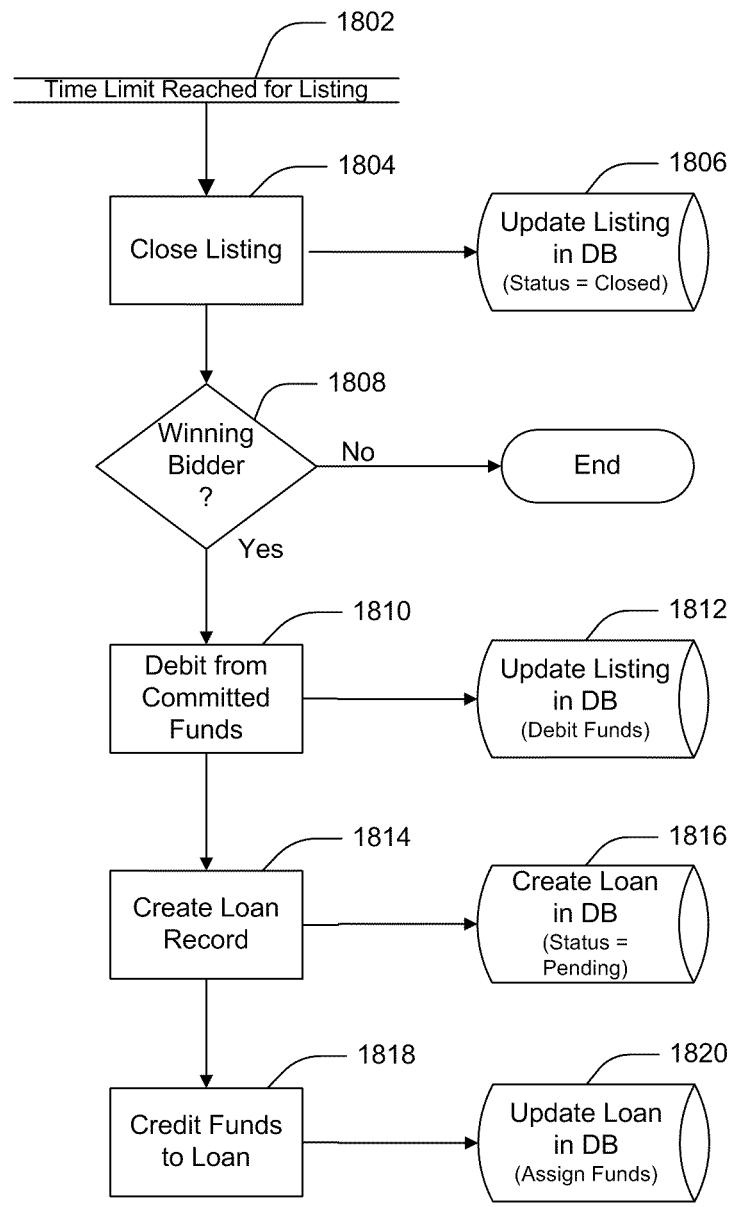
FIG. 18 illustrates the process to close a listing created by a Lender.

FIG. 18 illustrates the process that the system uses to close a listing created by a Lender once an allotted period of time for being open for bids has elapsed. The process for finalizing an instant loan; is similar, however the winning bidder does not need to be determined.

The process is initiated by a background process on the system that monitors the scheduled ending times of all active user listings. When the system process identifies a listing that is due to be closed (1802), the listing is closed (1804), which may include updating the status of the listing in the database to indicate it has closed (1806). No further bids are permitted after a listing is closed. The system computes whether there were any Bids placed on the listing and determines the winning bid. If there were no bids the listing has been unsuccessful. If there were Bids, the highest ranked will have been ranked as the winners prior to the listing closing (1808). If there were no Bids (No at 1808), the process may end with an email sent to the user who created the listing notifying them of the outcome If there were one or more bids (Yes at 1808), the current highest ranking Bid is the winning bid, and the funds attached to the listing will fund the resulting loans. These funds are debited from the listing funding record (1810). The funds assigned to the funding record in the database for the Bid are debited by the system (1812).

The system initiates new loans in a pending status for each winning bid (1814), this is recorded by the system in the database with a loan record for each new loan (1816). The funds debited from the Lender's listing are assigned to each new Loan (1818). The system creates a funding record (1820) in the database which is associated with the Pending Loan record for each loan being created, recording the assignment of the Lenders funds to that loan. The process terminates with the system sending emails to the Lender and each successful Borrower notifying them of the outcome of the listing.

The lending facilitation service including the assessment system described herein is applicable to individuals and businesses who interact on the internet as well as those who want to borrow or lend money. It is also applicable to financial institutions and businesses that may want to borrow or lend more conveniently, quickly and efficiently than through traditional means. The larger the number of borrowers and lenders the more efficiently the market and pricing mechanisms will work. Subject only to the regulatory requirements wherein the present disclosure is deployed loans and funds transfers may be of any amount and may originate in any country wherever there exists computers and Internet access.

The wide-spread use of the P2P model may bring about wide ranging economic benefits for individuals and entities using the P2P model by reducing the time and cost of transferring funds, finding and funding loans and compliance with an ever-expanding and highly fragmented set of regulatory requirements.

The present disclosure might also be used internationally and/or domestically for electronic bill payments, invoicing, merchant payments, person-to-person money transfer, person-to-business money transfer, business-to-person money transfer, recurring payments, gift giving, collection of dues and membership fees.

Loan types and financial transactions may include student loans, business loans, mortgages, secured loans, unsecured loans, asset purchase loans, letters of credit, factoring, revolving credit and installment loans again subject only to the regulatory scheme dictated by jurisdiction and transaction type.

Although the figures and description have described many specifics for the purposes of illustration, anyone of ordinary skill in the art will appreciate that many variations and alterations to the following details are within the scope of the present disclosure. Accordingly, the following embodiments are set forth without any loss of generality to, and without imposing limitations upon, the claimed subject matter.

The invention claimed is:

1. A computer-implemented method of assessing credit risk of a borrowing party in an on-line lending environment at an assessment system, the method comprising:
receiving a request through a computer network from a lending facilitation service to determine an assessment score for the borrowing party;
identifying a social networking service that the borrowing party is associated with;

verifying the borrowing party on the social networking service;

providing a web page component for installation on the borrowing party's user profile of the identified social networking service;

receiving borrower data through the computer network comprising borrowing party's user profile data and social networking connection data identifying additional user profiles linked to the borrowing party's user profile collected using the web page component;

analyzing the social networking connection data of the received borrowing party's data to determine a respective assessment score and a length of time and level of activity of each first level connection of additional user profiles linked directly to the borrowing party's user profile on the social networking service to provide an assigned weighting for each first level connection to the respective assessment score;

calculating a base score for the borrowing party's profile based on the received borrower data;

storing the borrowing party's user profile data and base score in a user profile datastore;

determining an assessment score for the borrowing party using the base score and assessment scores and assigned weightings of the first level connections having assessment scores; and storing the determined assessment score in the user profile datastore.

2. The method of claim 1 wherein for each first level connection the method further comprising:

determining a user profile associated with the first level connection; and determining if an assessment score is stored in the user profile store for the determined user profile and can be used for determining the assessment score for the borrowing party.

3. The method of claim 1 further comprising:

prompting the borrowing party to invite first level connections to provide a personal endorsement of the borrowing party;

sending an endorsement invitation to first level connections; and receiving endorsements from the first level connections, the endorsement providing a rating of the user trustworthiness based on a numerical scale;

determining and aggregate endorsement score from received endorsements, the aggregate endorsement score used in determining assessment score.

4. The method of claim 3 wherein the endorsement invitation is only sent to first level connections of the social network service that have been previously verified.

5. The method of claim 1 wherein the assessment score further comprises a credit worthiness score which is determined comprising a profile criteria score, a lending history score, the base score and the endorsement score wherein each score has an associated weighting to determine the assessment score.

6. The method of claim 5 wherein the profile criteria score further comprises a score for verified identification and a retrieved credit bureau score for the borrowing party.

7. The method of claim 1 wherein said assessment score can be used by a lender to filter, block, price or search for a compatible borrowing party.

8. The method of claim 1 wherein the assigned weightings is applied for each of the first level connection for the borrowing party, each of the assigned weighting being further dependent on the number of relationships to the one or more linking documents to determine the assessment score.

9. A computer readable non-transitory memory containing instructions for performing a method of assessing credit risk of a borrowing party in an on-line lending environment when executed by a processor, the instructions comprising:

receiving a request through a computer network from a lending facilitation service to determine an assessment score for the borrowing party;

identifying a social networking service that the borrowing party is associated with;

verifying the borrowing party on the social networking service;

providing a web page component for installation on the borrowing party's user profile of the identified social networking service;

receiving borrower data through the computer network comprising borrowing party's user profile data and social networking connection data identifying additional user profiles linked to the borrowing party's user profile collected using the web page component;

analyzing the social networking connection data of the received borrowing party's data to determine a respective assessment score and a length of time and level of activity of each first level connection of additional user profiles linked directly to the borrowing party's user profile on the social networking service to provide an assigned weighting for each first level connection to their respective assessment scores;

calculating a base score for the borrowing party's profile based on the received borrower data;

storing the borrowing party's user profile data and base score in a user profile datastore;

determining an assessment score for the borrowing party using the base score and assessment scores and assigned weightings of the one or more first level connections having assessment scores; and storing the determined assessment score in the user profile datastore.

10. The computer readable non-transitory memory of claim 9 wherein for each first level connection the instructions further comprising:

determining a user profile associated with the first level connection; and determining if an assessment score is stored in the user profile store for the determined user profile and can be used for determining the assessment score for the borrowing party.

11. The computer readable non-transitory memory of claim 9 wherein the instructions further comprising:

prompting the borrowing party to invite first level connections to provide a personal endorsement of the borrowing party;

sending an endorsement invitation to first level connections; and receiving endorsements from the first level connections, the endorsement providing a rating of the user trustworthiness based on a numerical scale;

determining and aggregate endorsement score from received endorsements, the aggregate endorsement score used in determining the assessment score.

12. The computer readable non-transitory memory of claim 11 wherein the endorsement invitation is only sent to first level connections of the social network service that have been previously verified.

13. The computer readable non-transitory memory of claim 9 wherein the assessment score further comprises a credit worthiness score which is determined comprising a profile criteria score, a lending history score, the base score and the endorsement score wherein each score has an associated weighting to determine the assessment score.

14. The computer readable non-transitory memory of claim 13 wherein the profile criteria score further comprises a score for verified identification and a retrieved credit bureau score for the borrowing party.

15. The computer readable non-transitory memory of claim 9 wherein said assessment score can be used by a lender to filter, block, price or search for a compatible borrowing party.

16. The computer readable non-transitory memory of claim 9 wherein the assigned weightings is applied for each of the first level connection for the borrowing party, each of the assigned weighting being further dependent on the number of relationships to the one or more linking documents to determine the assessment score.

* * * * *